US012675188B2

(12) United States Patent
Lim et al.

(10) Patent No.: US 12,675,188 B2
(45) Date of Patent: *Jul. 7, 2026

(54) DISPLAY DEVICE AND TOUCH SENSING SYSTEM INCLUDING THE SAME

(71) Applicant: Samsung Display Co., Ltd., Yongin-Si (KR)

(72) Inventors: Sang Hyun Lim, Cheonan-si (KR); Ga Young Kim, Hwaseong-si (KR); Young Min Park, Gwangmyeong-si (KR); Hyun Jee Jeon, Hanam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/087,643

(22) Filed: Mar. 24, 2025

(65) Prior Publication Data

US 2025/0216978 A1 Jul. 3, 2025

Related U.S. Application Data

(60) Continuation of application No. 18/595,419, filed on Mar. 5, 2024, now Pat. No. 12,282,625, which is a
(Continued)

(30) Foreign Application Priority Data

Apr. 15, 2021 (KR) ........................ 10-2021-0049193

(51) Int. Cl.
*G06F 3/041* (2006.01)
*G06F 3/044* (2006.01)
*G06F 3/046* (2006.01)

(52) U.S. Cl.
CPC ........ *G06F 3/04166* (2019.05); *G06F 3/0412* (2013.01); *G06F 3/04164* (2019.05); *G06F 3/0446* (2019.05); *G06F 3/046* (2013.01)

(58) Field of Classification Search
CPC .............. G06F 3/0412; G06F 3/04164; G06F 3/04166; G06F 3/0446; G06F 3/046
See application file for complete search history.

(56) References Cited

U.S. PATENT DOCUMENTS 10,146,336 B2 12/2018 Lee et al.
10,310,640 B2 6/2019 Lee et al.
(Continued)

FOREIGN PATENT DOCUMENTS

CN 109471566 A 3/2019
CN 110058712 A 7/2019
(Continued)

*Primary Examiner* — Robin J Mishler
(74) *Attorney, Agent, or Firm* — Innovation Counsel LLP

(57) ABSTRACT

A display device includes a display unit having pixels, a touch sensing unit including touch electrodes disposed on the display unit, and a touch driver configured to supply a touch driving signal to the plurality of touch electrodes and receive a touch sensing signal from the touch electrodes. The touch driver supplies a first touch driving signal having a first phase to one or more first touch electrodes, and supplies a second touch driving signal having a second phase opposite to the first phase to one or more second touch electrodes, at least a part of which is disposed across a specific point from the first touch electrodes. The touch driver receives a first touch sensing signal having the first phase from at least one of the first touch electrodes, and receives a second touch sensing signal having the second phase from at least one of the second touch electrodes.

20 Claims, 19 Drawing Sheets

Related U.S. Application Data division of application No. 17/545,452, filed on Dec. 8, 2021, now Pat. No. 11,947,755.

(56) References Cited

U.S. PATENT DOCUMENTS

| | | | | |
|---|---|---|---|---|
| 10,871,852 | B2 | 12/2020 | Kim et al. | |
| 11,650,701 | B2 | 5/2023 | Baek | |
| 11,947,755 | B2 * | 4/2024 | Lim | G06F 3/0441 |
| 12,086,365 | B2 | 9/2024 | Baek | |
| 12,282,625 | B2 * | 4/2025 | Lim | G06F 3/0441 |
| 2014/0035870 | A1 | 2/2014 | Yeh et al. | |
| 2014/0176486 | A1 | 6/2014 | Lee et al. | |
| 2014/0285465 | A1 | 9/2014 | Hayashi et al. | |
| 2015/0370366 | A1 | 12/2015 | Johnson et al. | |
| 2015/0378479 | A1 * | 12/2015 | Hayashi | G06F 3/0446 |
| | | | | 345/174 |
| 2017/0068838 | A1 | 3/2017 | Kravets et al. | |
| 2018/0018028 | A1 * | 1/2018 | Lee | G06F 3/0383 |

FOREIGN PATENT DOCUMENTS

| | | | |
|---|---|---|---|
| KR | 10-2016-0025440 | A | 3/2016 |
| KR | 10-2016-0095947 | A | 8/2016 |
| KR | 10-2018-0092478 | A | 8/2018 |
| KR | 10-2170298 | B1 | 10/2020 |

* cited by examiner

FIG. 1

Charging

Induced
Current

L1

C1

22

20

21

TE

TE2   TE1

VMF

Magnetic
Field

Charging

L1

C1

Induced
Current

22

20

21

TE

TE2　TE1

VMF

420

424 422 421　423

400

I

I

Magnetic
Field

PT

TL2　TL1

TL 431　432

430

411　412

410

450

DISPLAY DEVICE AND TOUCH SENSING SYSTEM INCLUDING THE SAME

CROSS-REFERENCE TO RELATED APPLICATION

This application is a Continuation application of U.S. patent application Ser. No. 18/595,419 filed on Mar. 5, 2024, which is a Divisional Application of U.S. patent application Ser. No. 17/545,452 filed on Dec. 8, 2021, now U.S. Pat. No. 11,947,755, which claims priority to Korean Patent Application No. 10-2021-0049193 filed on Apr. 15, 2021, in the Korean Intellectual Property Office, and all the benefits accruing therefrom under 35 U.S.C. 119, the contents of which are herein incorporated by reference.

BACKGROUND

1. Technical Field

The present disclosure relates to a display device and a touch sensing system including the same.

2. Description of the Related Art

In today's information-oriented society, more and more demands are placed on display devices for displaying images in various ways. For example, display devices are employed in various electronic devices such as smartphones, digital cameras, laptop computers, navigation devices, and smart televisions. The display device may be a flat panel display device such as a liquid crystal display device, a field emission display device and an organic light emitting display device. Among the flat panel display devices, in the light emitting display device, since each of pixels of a display panel includes a light emitting element capable of emitting light by itself, an image can be displayed without a backlight unit providing light to the display panel.

A touch sensing unit which recognizes a touch input has been widely applied as an input device of a display device mainly in a smartphone or tablet PC. The touch sensing unit determines whether a user inputs a touch, and calculates a corresponding position as touch input coordinates. The display device supports a touch input using a user's body part (e.g., a finger) and a touch input using an electronic pen.

SUMMARY

Aspects of the present disclosure provide a display device capable of sensing a touch of a touch input member by using a touch sensing unit that senses a touch of a user's body, without including a separate sensor layer or digitizer layer.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an embodiment of the disclosure, a display device comprises a display unit having a plurality of pixels, a touch sensing unit comprising a plurality of touch electrodes disposed on the display unit, and a touch driver configured to supply a touch driving signal to the plurality of touch electrodes and receive a touch sensing signal from the plurality of touch electrodes. The touch driver supplies a first touch driving signal having a first phase to one or more first touch electrodes, and supplies a second touch driving signal having a second phase opposite to the first phase to one or more second touch electrodes, at least a part of which is disposed across specific point from the first touch electrodes. The touch driver receives a first touch sensing signal having the first phase from at least one of the first touch electrodes, and receives a second touch sensing signal having the second phase from at least one of the second touch electrodes.

The first touch electrodes may comprise a plurality of first driving electrodes extending in a first direction, and a plurality of first sensing electrodes extending in a second direction crossing the first direction. The first touch electrodes may comprise a plurality of second driving electrodes extending in the first direction and a plurality of second sensing electrodes extending in the second direction, the first sensing electrodes being across the specific point from the second sensing electrodes. The touch driver may supply a first touch driving signal having the first phase to one of the first driving electrodes, and may supply a second touch driving signal having the second phase to one of the second driving electrodes.

The touch driver may receive the first touch sensing signal having the first phase from at least one of the first driving electrode and may receive the second touch sensing signal having the second phase from at least one of the second driving electrode.

The touch driver may differentially amplify the first and second touch sensing signals to output a differential sensing signal.

The first touch electrodes may comprise a plurality of first driving electrodes extending in a first direction, and a plurality of first sensing electrodes extending in a second direction crossing the first direction. The second touch electrodes comprise a plurality of second driving electrodes extending in the first direction and a plurality of second sensing electrodes extending in the second direction, the first sensing electrodes being across the specific point from the second sensing electrodes. The touch driver may supply the first touch driving signal having the first phase to the first driving electrodes, and may supply the second touch driving signal having the second phase to the second driving electrodes.

The touch driver may receive the first touch sensing signal having the first phase from the first driving electrodes, and may receive the second touch sensing signal having the second phase from the second driving electrodes.

The touch driver may supply a touch driving signal to N touch electrodes (N being a positive integer) among the plurality of first and second touch electrodes, and may receive a touch sensing signal from M touch electrodes (M being a positive integer different from N) among the plurality of first and second touch electrodes.

The first touch electrodes may comprise a plurality of first driving electrodes extending in a first direction, and a plurality of first sensing electrodes extending in a second direction crossing the first direction. The second touch electrodes comprise a plurality of second driving electrodes extending in the first direction and a plurality of second sensing electrodes extending in the second direction, the first sensing electrodes being across the specific point from the second sensing electrodes. The touch driver may supply the first touch driving signal having the first phase to at least one of the first driving electrodes, and one of the first sensing electrodes. The touch driver may supply the second touch driving signal having the second phase to at least one of the second driving electrodes and one of the second sensing electrodes.

The touch driver may receive the first touch sensing signal having the first phase from the first driving electrodes and the first sensing electrodes, and may receive the second touch sensing signal having the second phase from the second driving electrodes and the second sensing electrodes.

The touch driver may determine first axis coordinates of the specific point based on positions of the first and second driving electrodes, and may determine second axis coordinates of the specific point based on positions of the first and second sensing electrodes.

For each of a plurality of electromagnetic sensing periods, the touch driver may select first touch electrodes and second touch electrodes to sequentially supply a touch driving signal to the selected touch electrodes, and may sequentially receive a touch sensing signal from the first touch electrodes and the second touch electrodes.

The touch driver may comprise a driving signal supply unit configured to supply the touch driving signal to the plurality of touch electrodes, a sensing signal receiving unit configured to receive the touch sensing signal from the plurality of touch electrodes, a switching unit configured to selectively connect the plurality of touch electrodes to the driving signal supply unit or the sensing signal receiving unit, and a control unit configured to determine whether a touch has been made based on an output of the sensing signal receiving unit.

The driving signal supply unit may comprise a first driving signal output module configured to supply the first touch driving signal to at least one touch electrode disposed on one side of the specific point, and a second driving signal output module configured to supply the second touch driving signal to at least one touch electrode disposed on the other side of the specific point.

The switching unit may comprise a first switching unit configured to connect at least one touch electrode disposed on one side of the specific point to the first driving signal output module during a first period, and configured to connect at least one touch electrode disposed on one side of the specific point to a first input terminal of the sensing signal receiving unit during a second period immediately after the first period, and a second switching unit configured to connect at least one touch electrode disposed on the other side of the specific point to the second driving signal output module during the first period, and configured to connect at least one touch electrode disposed on the other side of the specific point to a second input terminal of the sensing signal receiving unit during the second period.

The switching unit may comprise a first multiplexer configured to select some of the plurality of touch electrodes and connect the selected touch electrodes to the first switching unit, and a second multiplexer configured to select some other touch electrodes from among the plurality of touch electrodes and connect the selected touch electrodes to the second switching unit.

According to an embodiment of the disclosure, a display device comprises a display unit having a plurality of pixels, a touch sensing unit comprising a plurality of driving electrodes disposed on the display unit, and a plurality of driving lines connected to the plurality of driving electrodes, and a touch driver configured to supply a touch driving signal to the plurality of driving electrodes through the plurality of driving lines and receive a touch sensing signal from the plurality of driving electrodes. A first driving line of the plurality of driving lines is connected to one end of a first driving electrode disposed on a first side of a specific point among the plurality of driving electrodes, and a second driving line of the plurality of driving lines is connected to another end of a second driving electrode disposed on a second side of the specific point among the plurality of driving electrodes.

The touch driver may supply a first touch driving signal having a first phase to the first driving line, and may supply a second touch driving signal having the first phase to the second driving line.

The touch driver may receive a first touch sensing signal having the first phase from the first driving line, and may receive a second touch sensing signal having the first phase from the second driving line to delay a phase of the second touch sensing signal.

According to an embodiment of the disclosure, a touch sensing system comprises a display device configured to display an image, and a touch input member configured to input a touch to the display device. The display device comprises a display unit having a plurality of pixels;

a touch sensing unit comprising a plurality of touch electrodes disposed on the display unit, and a touch driver configured to supply a touch driving signal to the plurality of touch electrodes and receive a touch sensing signal from the plurality of touch electrodes. The touch driver supplies a first touch driving signal having a first phase to one or more second touch electrodes, and supplies a second touch driving signal having a second phase opposite to the first phase to one or more second touch electrodes, at least a part of which is disposed across a specific point from the first touch electrodes. The touch driver receives a first touch sensing signal having the first phase from at least one of the first touch electrodes, and receives a second touch sensing signal having the second phase from at least one of the second touch electrodes.

The touch input member may be charged by an electromagnetic resonance method when the touch input member is disposed at the specific point during a first period in which the first and second touch driving signals are supplied to the touch sensing unit.

The touch input member may be discharged when the supply of the first and second touch driving signals is stopped during a second period immediately after the first period. The touch driver may receive the first touch sensing signal having the first phase from at least one of the first touch electrodes during the second period, and may receive the second touch sensing signal having the second phase from at least one of the second touch electrodes.

The first touch electrodes may comprise a plurality of first driving electrodes extending in a first direction and a plurality of first sensing electrodes extending in a second direction crossing the first direction. The second touch electrodes comprise a plurality of second driving electrodes extending in the first direction and a plurality of second sensing electrodes extending in the second direction, the first sensing electrodes being across the specific point from the second sensing electrodes. The touch driver may supply the first touch driving signal having the first phase to at least one of the first driving electrodes, and may supply the second touch driving signal having the second phase to at least one of the second driving electrodes.

The touch driver may receive the first touch sensing signal having the first phase from one of the first driving electrodes and may receive the second touch sensing signal having the second phase from one of the second driving electrodes.

In the display device and a touch sensing system including the same according to embodiments, a touch driver may supply first and second touch driving signals having opposite phases to the first and second driving electrodes disposed to both sides of a specific point, respectively, to generate a magnetic field in a vertical direction by constructive interference of magnetic fields, thereby charging the touch input member. The touch driver may differentially amplify first and second touch sensing signals induced based on a magnetic field formed in a vertical direction according to discharging of the touch input member to output a differential sensing signal, and may determine whether the touch input member has been touched. The display device may sense a touch of the touch input member by using a touch sensing unit that senses a touch of the user's body. Accordingly, the display device does not include a separate sensor layer or a digitizer layer for the electromagnetic resonance of the touch input member, thereby reducing the thickness of the display device and reducing cost.

However, the effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a perspective view showing a display device according to one embodiment;

FIG. 16 is a diagram illustrating discharging of a touch input member and a touch sensing process in a touch sensing system according to still another embodiment;

DETAILED DESCRIPTION OF THE EMBODIMENTS

Figure 2:
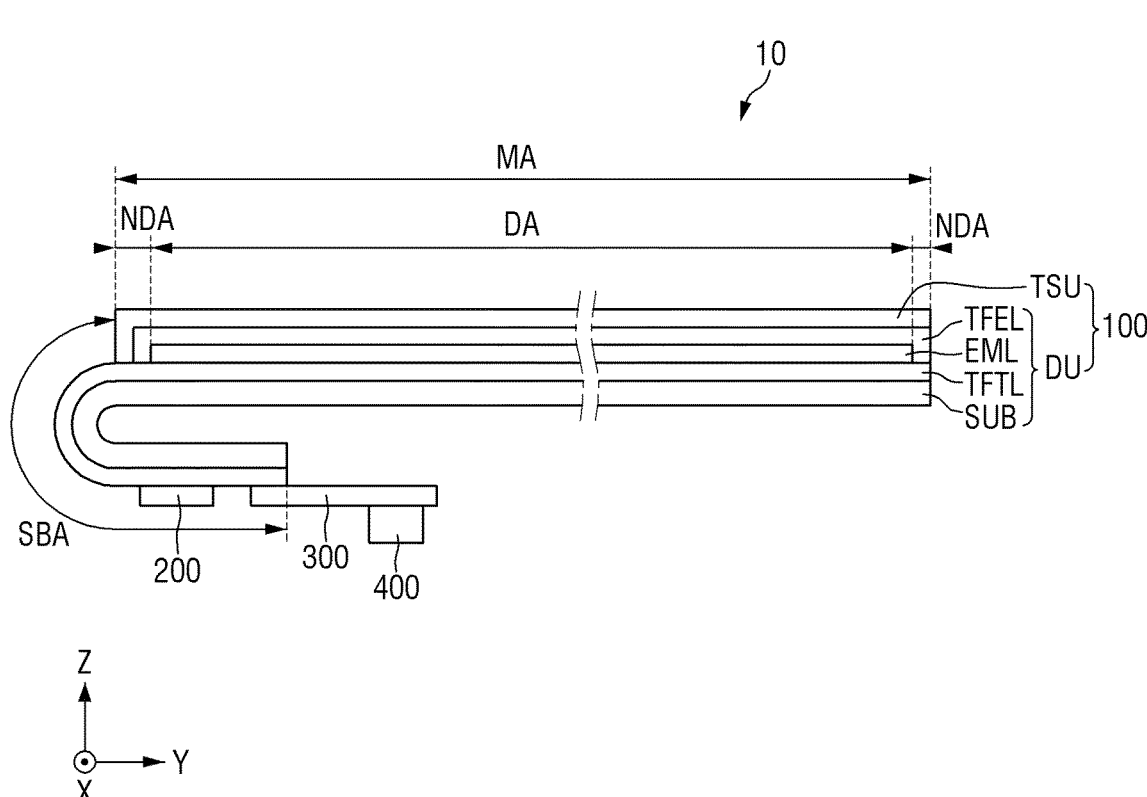
FIG. 2 is a cross-sectional view illustrating a display device according to one embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or overly formal sense, unless clearly so defined herein.

Figure 1:
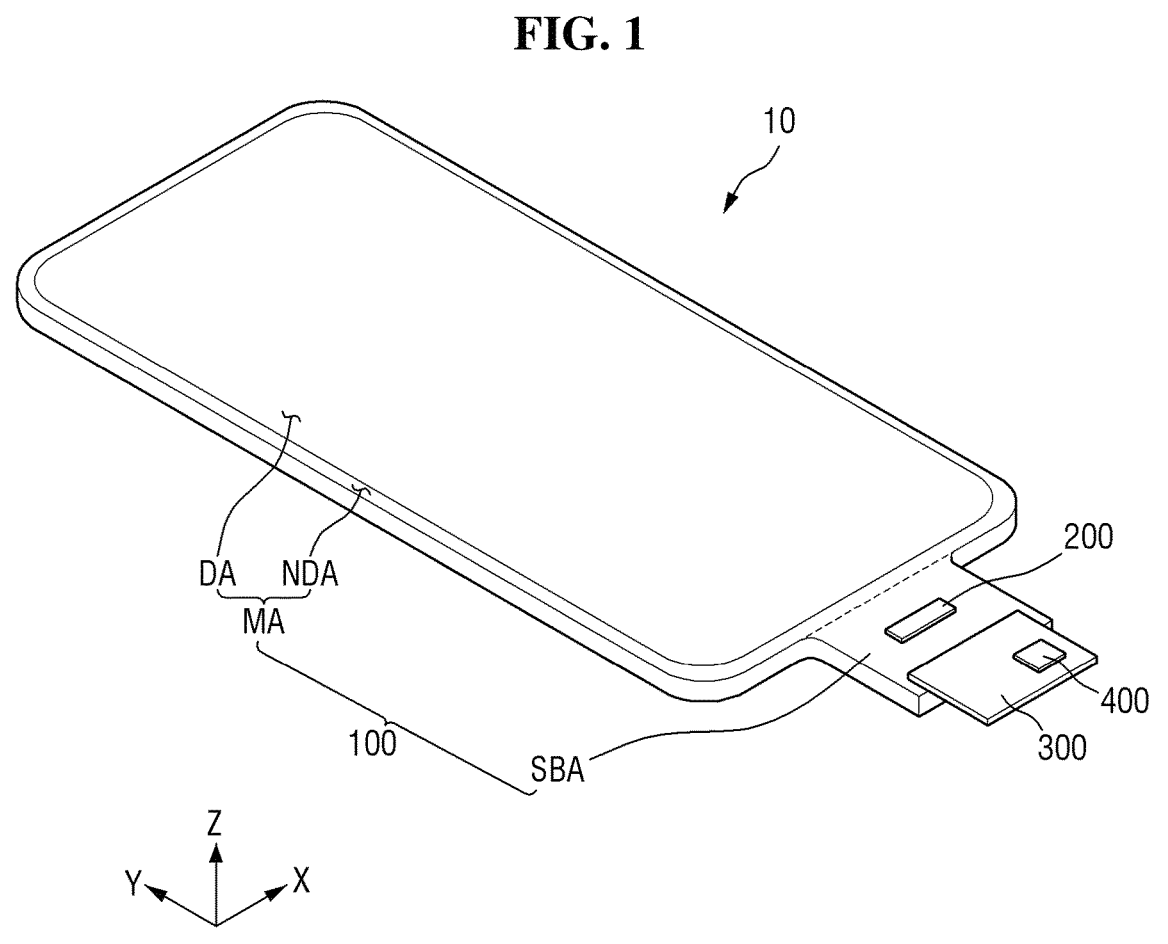

FIG. 1 is a perspective view showing a display device according to one embodiment.

Referring to FIG. 1, a display device 10 may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. For example, the display device 10 may be applied as a display unit of a television, a laptop, a monitor, a billboard, or an Internet-of-Things (IoT) device. As another example, the display device 10 may be applied to wearable devices such as a smart watch, a watch phone, a glasses type display, or a head mounted display (HMD). As yet another example, the display device 10 may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

The display device 10 may have a planar shape similar to a quadrilateral shape. For example, the display device 10 may have a shape similar to a quadrilateral shape, in a plan view, having short sides in a first direction (X-axis direction)

and long sides in a second direction (Y-axis direction). The corner where the short side in the first direction (X-axis direction) and the long side in the second direction (Y-axis direction) meet may be rounded to have a predetermined curvature or may be right-angled. The planar shape of the display device 10 is not limited to a quadrilateral shape, and may be formed in a shape similar to another polygonal shape, a circular shape, or elliptical shape.

The display device 10 may include a display panel 100, a display driver 200, a circuit board 300, and a touch driver 400.

The display panel 100 may include a main region MA and a sub-region SBA.

The main region MA may include the display area DA including pixels displaying an image and the non-display area NDA disposed around the display area DA. The display area DA may emit light from a plurality of emission areas or a plurality of opening areas. For example, the display panel 100 may include a pixel circuit including switching elements, a pixel defining layer defining a light emitting area or an opening area, and a self-light emitting element.

For example, the self-light emitting element may include at least one of an organic light emitting diode including an organic light emitting layer, a quantum dot light emitting diode including a quantum dot light emitting layer, or an inorganic light emitting diode including an inorganic semiconductor, but is not limited thereto.

The non-display area NDA may be an area outside the display area DA. The non-display area NDA may be defined as an edge area of the main region MA of the display panel 100. The non-display area NDA may include a gate driver that supplies gate signals to the gate lines, and fan-out lines that connect the display driver 200 to the display area DA.

The sub-region SBA may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include a display driver 200 and a pad unit connected to a circuit board 300. Optionally, the sub-region SBA may be omitted, and the display driver 200 and the pad unit may be arranged in the non-display area NDA.

The display driver 200 may output signals and voltages for driving the display panel 100. The display driver 200 may supply a data voltage to a data line. The display driver 200 may supply a power voltage to the power line and may supply a gate control signal to the gate driver. The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-region SBA, and may overlap the main region MA in the thickness direction (Z-axis direction) by bending of the sub-region SBA. For another example, the display driver 200 may be mounted on the circuit board 300.

The circuit board 300 may be attached to the pad unit of the display panel 100 by using an anisotropic conductive film (ACF). Lead lines of the circuit board 300 may be electrically connected to a pad unit of the display panel 100. The circuit board 300 may be a flexible printed circuit board, a printed circuit board, or a flexible film such as a chip on film.

A touch driver 400 may be mounted on the circuit board 300. The touch driver 400 may be connected to a touch sensing unit of the display panel 100. The touch driver 400 may supply a touch driving signal to a plurality of touch electrodes of the touch sensing unit and may sense an amount of change in capacitance between the plurality of touch electrodes. For example, the touch driving signal may be a pulse signal having a predetermined frequency. The touch driver 400 may calculate whether a touch is inputted and touch coordinates based on an amount of change in capacitance between the plurality of touch electrodes. The touch driver 400 may be formed of an integrated circuit (IC).

FIG. 2 is a cross-sectional view illustrating a display device according to one embodiment.

Referring to FIG. 2, the display panel 100 may include a display unit DU and a touch sensing unit TSU. The display unit DU may include the substrate SUB, the thin film transistor layer TFTL, the light emitting element layer EML, and the encapsulation layer TFEL.

The substrate SUB may be a base substrate or a base member, and may be made of an insulating material such as a polymer resin. The substrate SUB may be a flexible substrate which can be bent, folded or rolled. For example, the substrate SUB may include an insulating material such as a polymer resin such as polyimide (PI), but the present disclosure is not limited thereto.

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines that connect the display driver 200 to the data lines, lead lines that connect the display driver 200 to the pad unit, and the like. Each of the thin film transistors may include a semiconductor region, a drain electrode, a source electrode, and a gate electrode. For example, when the gate driver is formed on one side of the non-display area NDA of the display panel 100, the gate driver may include thin film transistors.

The thin film transistor layer TFTL may be disposed in the display area DA, the non-display area NDA, and the sub-region SBA. Thin film transistors, gate lines, data lines, and power lines of each of the pixels of the thin film transistor layer TFTL may be disposed in the display area DA. Gate control lines and fan-out lines of the thin film transistor layer TFTL may be disposed in the non-display area NDA. The lead lines of the thin film transistor layer TFTL may be disposed in the sub-region SBA.

The light emitting element layer EML may be disposed on the thin film transistor layer TFTL. The light emitting element layer EML may include a plurality of light emitting elements in which a first electrode, a light emitting layer, and a second electrode are sequentially stacked to emit light, and a pixel defining layer defining pixels. A plurality of light emitting elements of the light emitting element layer EML may be disposed in the display area DA.

For example, the light emitting layer may be an organic light emitting layer including an organic material. The light emitting layer may include a hole transporting layer, an organic light emitting layer, and an electron transporting layer. When the first electrode receives a predetermined voltage through the thin film transistor of the thin film transistor layer TFTL and the second electrode receives the cathode voltage, holes and electrons may be transferred to the organic light emitting layer through the hole transporting layer and the electron transporting layer, respectively and may be combined with each other to emit light in the organic light emitting layer. For example, the first electrode may be an anode electrode, and the second electrode may be a cathode electrode, but the present disclosure is not limited thereto.

For another example, the light emitting element layer EML may include a quantum dot light emitting diode including a quantum dot light emitting layer or an inorganic light emitting diode including an inorganic semiconductor.

The encapsulation layer TFEL may cover the top surface and the side surface of the light emitting element layer EML, and may protect the light emitting element layer EML. The encapsulation layer TFEL may include at least one inorganic layer and at least one organic layer for encapsulating the light emitting element layer EML.

The touch sensing unit TSU may be disposed on the encapsulation layer TFEL. The touch sensing unit TSU may include a plurality of touch electrodes for sensing a user's touch in a capacitive manner, and touch lines connecting the plurality of touch electrodes to the touch driver 400. The touch electrode may include a driving electrode and a sensing electrode, and the touch line may include a driving line connected to the driving electrode and a sensing line connected to the sensing electrode. For example, the touch sensing unit TSU may sense a touch of a user's body by using a mutual capacitance or a self-capacitance method. The touch driver 400 may supply a touch driving signal to a plurality of driving electrodes and receive a touch sensing signal from a plurality of sensing electrodes to sense an amount of change in mutual capacitance between the driving electrode and the sensing electrode. The touch driver 400 may supply a touch driving signal to each of the plurality of driving electrodes and the plurality of sensing electrodes, and receive a touch sensing signal from each of the plurality of driving electrodes and the plurality of sensing electrodes, thereby sensing an amount of change in self-capacitance of each of the plurality of driving electrodes and the plurality of sensing electrodes.

For another example, the touch sensing unit TSU may sense an approach or contact of a touch input member such as a stylus pen. Here, the stylus pen may include a coil, and may output a radio frequency signal in response to a magnetic field or electromagnetic signal.

The plurality of touch electrodes of the touch sensing unit TSU may be disposed in a touch sensor area overlapping the display area DA. The touch lines of the touch sensing unit TSU may be disposed in a touch peripheral area that overlaps the non-display area NDA.

For example, a polarizing film and a cover window may be additionally disposed on the touch sensing unit TSU. The polarizing film may be disposed on the touch sensing unit TSU, and the cover window may be disposed on the polarizing film by an adhesive member.

The sub-region SBA of the display panel 100 may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and the pad unit connected to the circuit board 300.

Figure 3:
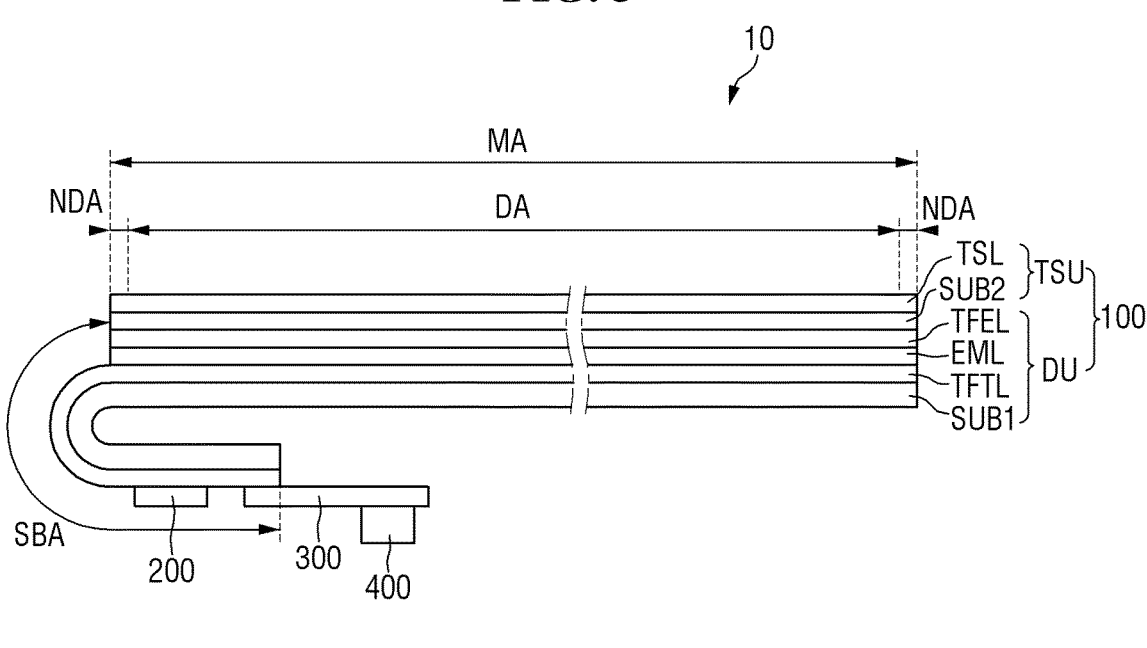
FIG. 3 is a cross-sectional view showing a display device according to another embodiment.
Figure 3:
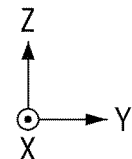

FIG. 3 is a cross-sectional view showing a display device according to another embodiment. The display device illustrated in FIG. 3 is different from the display device illustrated in FIG. 2 in the configuration of the touch sensing unit. A description of the same configuration as the above-described configuration will be briefly given or omitted.

Referring to FIG. 3, the display panel 100 may include the display unit DU and the touch sensing unit TSU. The display unit DU may include a first substrate SUB1, the thin film transistor layer TFTL, the light emitting element layer EML, and the encapsulation layer TFEL.

The first substrate SUB1 may be a base substrate or a base member, and may be made of an insulating material such as a polymer resin. For example, the first substrate SUB1 may include an insulating material such as a polymer resin such as polyimide (PI), but the present disclosure is not limited thereto.

The thin film transistor layer TFTL, the light emitting element layer EML, and the encapsulation layer TFEL may be sequentially stacked on the first substrate SUB1.

The touch sensing unit TSU may include a second substrate SUB2 and a touch sensor layer TSL. For example, the touch sensing unit TSU may be separately fabricated and attached to the display unit DU, but is not limited thereto.

The second substrate SUB2 may be disposed on the encapsulation layer TFEL. The second substrate SUB2 may be a base substrate or a base member, and may support the touch sensor layer TSL. For example, the second substrate SUB2 may include a glass material or a metal material, but is not limited thereto. For another example, the second substrate SUB2 may include an insulating material such as a polymer resin such as polyimide (PI).

The touch sensor layer TSL may be disposed on the second substrate SUB2. The touch sensor layer TSL may include a plurality of touch electrodes for sensing a user's touch in a capacitive manner, and touch lines connecting the plurality of touch electrodes to the touch driver 400. For example, the touch sensor layer TSL may sense the user's touch by using a mutual capacitance method or a self-capacitance method. For another example, the touch sensing unit TSU may sense an approach or contact of a touch input member such as a stylus pen.

Figure 4:
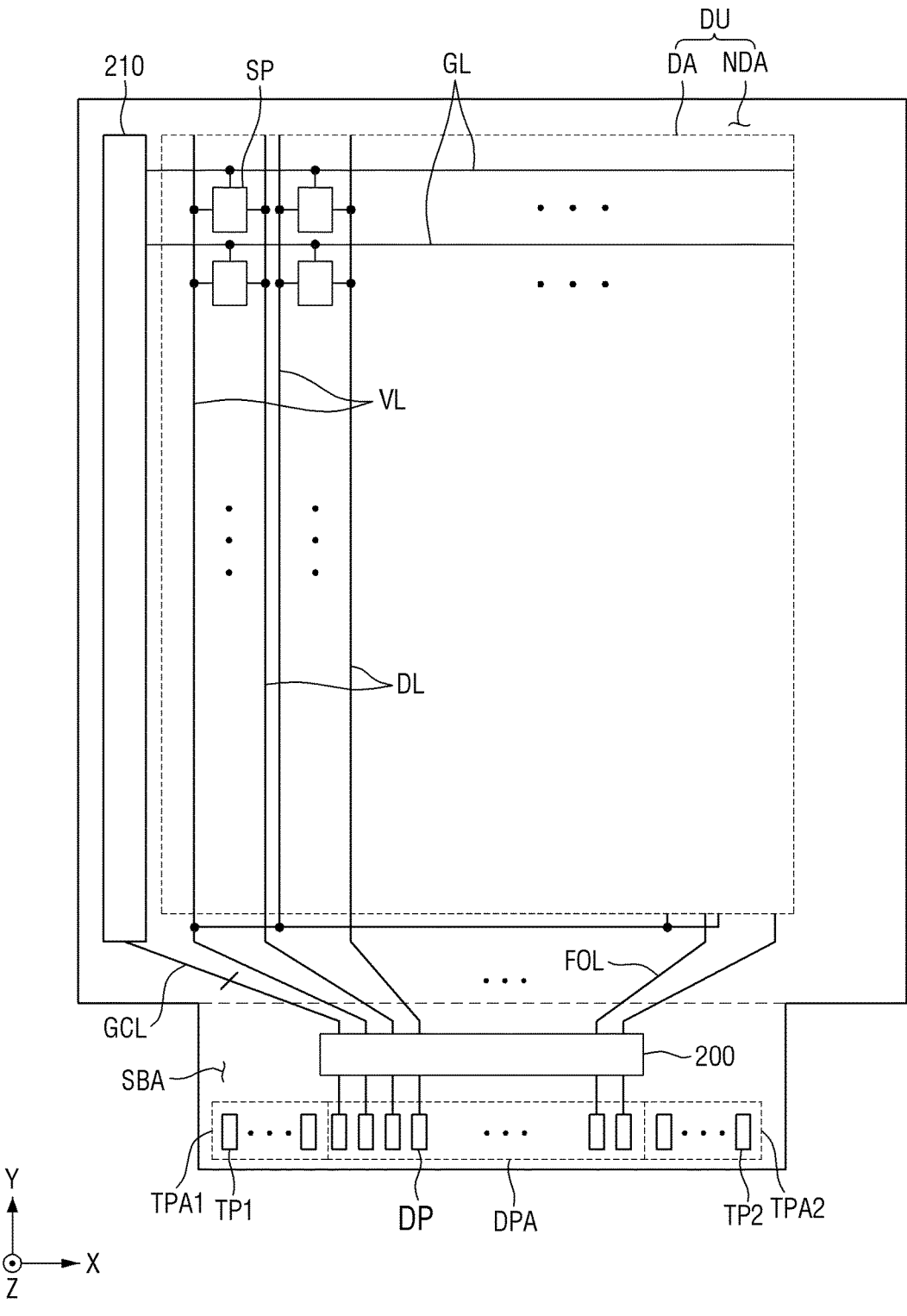
FIG. 4 is a plan view illustrating a display unit of a display device according to one embodiment.

FIG. 4 is a plan view illustrating a display unit of a display device according to one embodiment.

Referring to FIG. 4, the display unit DU may include the display area DA and the non-display area NDA.

The display area DA, which is an area for displaying an image, may be defined as the central area of the display panel 100. The display area DA may include a plurality of pixels SP, a plurality of gate lines GL, a plurality of data lines DL, and a plurality of power lines VL. Each of the plurality of pixels SP may be defined as an area of the smallest unit that outputs light.

The plurality of gate lines GL may supply the gate signals received from the gate driver 210 to the plurality of pixels SP. The plurality of gate lines GL may extend in the first direction (X-axis direction) and may be spaced apart from each other in the second direction (Y-axis direction) intersecting the first direction (X-axis direction).

The plurality of data lines DL may supply the data voltages received from the display driver 200 to the plurality of pixels SP. The plurality of data lines DL may extend in the second direction (Y-axis direction) and may be spaced apart from each other in the first direction (X-axis direction).

The plurality of power lines VL may supply the power voltage received from the display driver 200 to the plurality of pixels SP. Here, the power voltage may be at least one of a driving voltage, an initialization voltage, a reference voltage, or a low potential voltage. The plurality of power lines VL may extend in the second direction (Y-axis direction) and may be spaced apart from each other in the first direction (X-axis direction).

The non-display area NDA may surround the display area DA. The non-display area NDA may include a gate driver 210, fan-out lines FOL, and gate control lines GCL. The gate driver 210 may generate a plurality of gate signals based on the gate control signal, and may sequentially supply the plurality of gate signals to the plurality of gate lines GL according to a set order.

The fan-out lines FOL may extend from the display driver 200 to the display area DA. The fan-out lines FOL may supply the data voltage received from the display driver 200 to the plurality of data lines DL.

The gate control line GCL may extend from the display driver 200 to the gate driver 210. The gate control line GCL may supply the gate control signal received from the display driver 200 to the gate driver 210.

The sub-region SBA may include the display driver 200, a display pad area DPA, and first and second touch pad areas TPA1 and TPA2.

The display driver 200 may output signals and voltages for driving the display panel 100 to the fan-out lines FOL. The display driver 200 may supply a data voltage to the data line DL through the fan-out lines FOL. The data voltage may be supplied to the plurality of pixels SP to determine the luminance of the plurality of pixels SP. The display driver 200 may supply the gate control signal to the gate driver 210 through the gate control line GCL.

The display pad area DPA, the first touch pad area TPA1, and the second touch pad area TPA2 may be disposed at the edge of the sub-region SBA. The display pad area DPA, the first touch pad area TPA1, and the second touch pad area TPA2 may be electrically connected to the circuit board 300 by using an anisotropic conductive film or a low-resistance high-reliability material such as a self-assembly anisotropic conductive paste SAP.

The display pad area DPA may include a plurality of display pad units DP. The plurality of display pad units DP may be connected to the main processor through the circuit board 300. The plurality of display pad units DP may be connected to the circuit board 300 to receive digital video data, and may supply the digital video data to the display driver 200.

Figure 5:
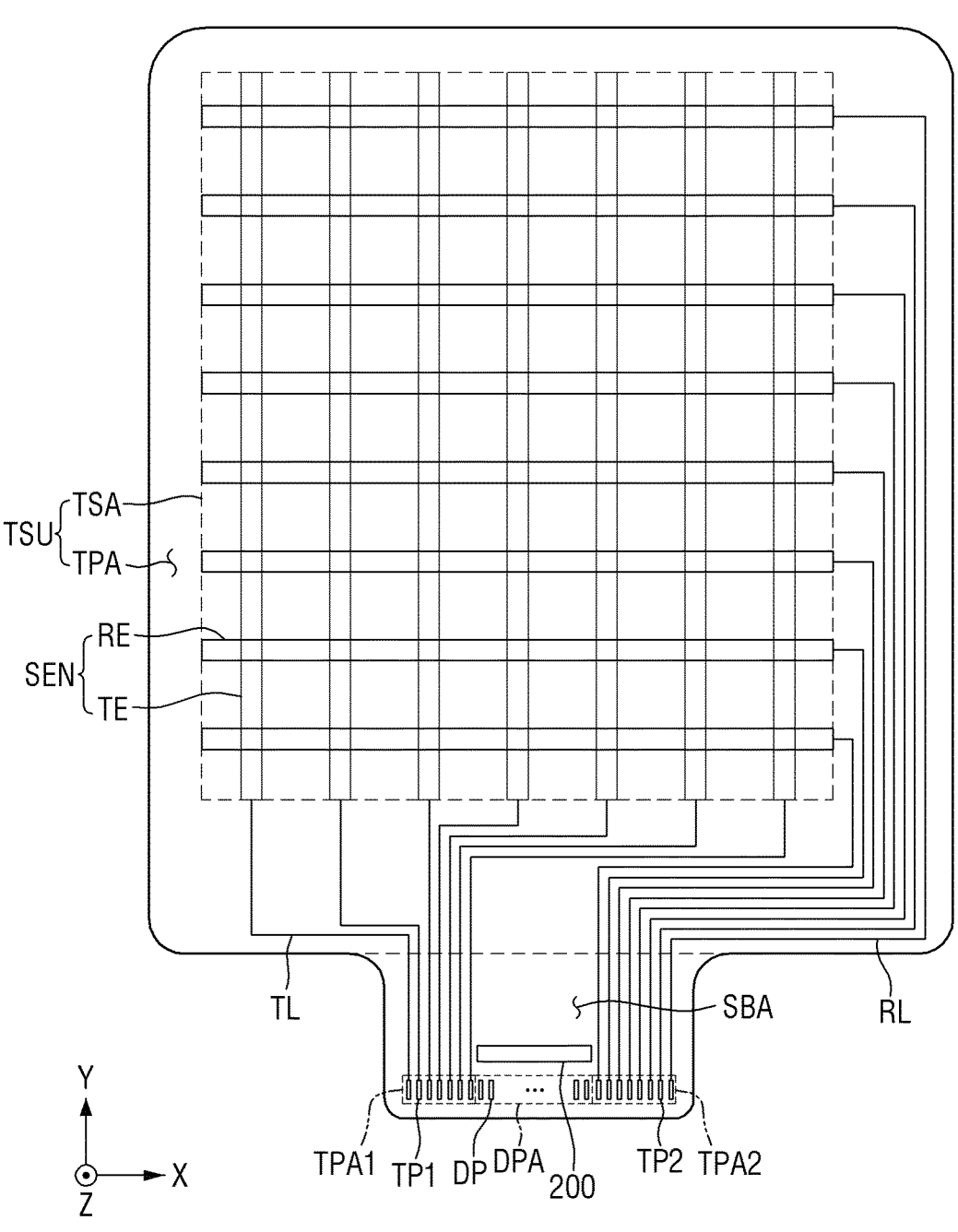
FIG. 5 is a plan view illustrating an example of a touch sensing unit in a display device according to one embodiment.

FIG. 5 is a plan view illustrating an example of a touch sensing unit in a display device according to one embodiment.

Referring to FIG. 5, the touch sensing unit TSU may include a touch sensor area TSA for sensing a user's touch, and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN. The plurality of touch electrodes SEN may form mutual capacitance or self-capacitance to sense a touch of an object or person. Each of the plurality of touch electrodes SEN may have a bar shape, but is not limited thereto. The plurality of touch electrodes SEN may include a plurality of driving electrodes TE and a plurality of sensing electrodes RE. The plurality of driving electrodes TE and the plurality of sensing electrodes RE may be disposed on different layers and insulated from each other. For example, the plurality of sensing electrodes RE may be disposed above the plurality of driving electrodes TE. For another example, the plurality of sensing electrodes RE may be disposed below the plurality of driving electrodes TE.

The plurality of driving electrodes TE may extend in the Y-axis direction and may be spaced apart from each other in the X-axis direction. The plurality of driving electrodes TE may be connected to a first touch pad unit TP1 through a driving line TL. For example, the driving electrodes TE disposed on the lower side of the touch sensor area TSA may be connected to the first touch pad unit TP1 through the driving line TL. The driving line TL may extend to the first touch pad unit TP1 through the lower side of the touch peripheral area TPA. The first touch pad unit TP1 may be connected to the touch driver 400 through the circuit board 300.

The plurality of sensing electrodes RE may extend in the X-axis direction and may be spaced apart from each other in the Y-axis direction. The plurality of sensing electrodes RE may be connected to the second touch pad unit TP2 through a sensing line RL. For example, the sensing electrodes RE disposed on the right side of the touch sensor area TSA may be connected to the second touch pad unit TP2 through the sensing line RL. The sensing line RL may extend to the second touch pad unit TP2 through the right side and the lower side of the touch peripheral area TPA. The second touch pad unit TP2 may be connected to the touch driver 400 through the circuit board 300.

The display pad area DPA, the first touch pad area TPA1, and the second touch pad area TPA2 may be disposed at the edge of the sub-region SBA. The display pad area DPA, the first touch pad area TPA1, and the second touch pad area TPA2 may be electrically connected to the circuit board 300 by using an anisotropic conductive film or a low-resistance high-reliability material such as SAP.

The first touch pad area TPA1 may be disposed on one side of the display pad area DPA, and may include a plurality of first touch pad units TP1. The plurality of first touch pad units TP1 may be electrically connected to the touch driver 400 disposed on the circuit board 300. The plurality of first touch pad units TP1 may supply a touch driving signal to the plurality of driving electrodes TE through a plurality of driving lines TL.

The second touch pad area TPA2 may be disposed on the other side of the display pad area DPA, and may include a plurality of second touch pad units TP2. The plurality of second touch pad units TP2 may be electrically connected to the touch driver 400 disposed on the circuit board 300. The touch driver 400 may receive a touch sensing signal through a plurality of sensing lines RL connected to the plurality of second touch pad units TP2, and may sense a change in mutual capacitance between the driving electrode TE and the sensing electrode RE.

As another example, the touch driver 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driver 400 may sense an amount of change in electric charge of each of the plurality of driving electrodes TE and the plurality of sensing electrodes RE based on the touch sensing signal.

Figure 6:
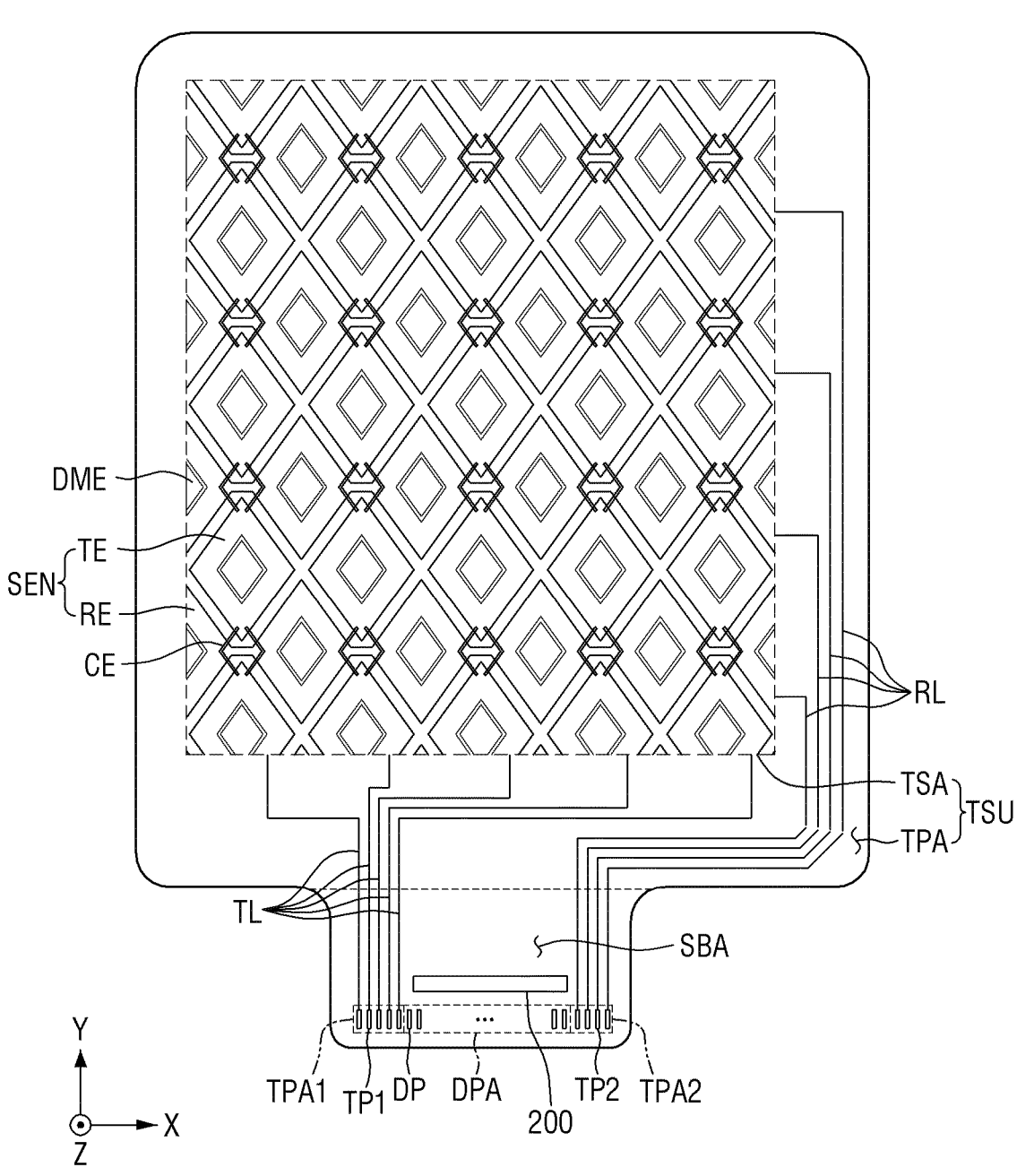
FIG. 6 is a plan view illustrating another example of a touch sensing unit in a display device according to one embodiment.

FIG. 6 is a plan view illustrating another example of a touch sensing unit in a display device according to one embodiment.

Referring to FIG. 6, the touch sensing unit TSU may include a touch sensor area TSA for sensing a user's touch, and a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DME. The plurality of touch electrodes SEN may form mutual capacitance or self-capacitance to sense a touch of an object or person. Each of the plurality of touch electrodes SEN may have a rhombic shape, but is not limited thereto. The plurality of touch electrodes SEN may include a plurality of driving electrodes TE and a plurality of sensing electrodes RE. The plurality of driving electrodes TE and the plurality of sensing electrodes RE may be disposed on the same layer.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent in the Y-axis direction may be electrically connected through a bridge electrode CE.

The plurality of driving electrodes TE may be connected to the first touch pad unit TP1 through a driving line TL. For example, the driving electrodes TE disposed on the lower side of the touch sensor area TSA may be connected to the first touch pad unit TP1 through the driving line TL. The driving line TL may extend to the first touch pad unit TP1 through the lower side of the touch peripheral area TPA. The first touch pad unit TP1 may be connected to the touch driver 400 through the circuit board 300.

The bridge electrode CE may be bent at least once. For example, the bridge electrode CE may have an angle bracket shape ("<" or ">"), but the planar shape of the bridge electrode CE is not limited thereto. The driving electrodes TE adjacent to each other in the second direction (Y-axis direction) may be connected by a plurality of bridge electrodes CE, and although any one of the bridge electrodes CE is disconnected, the driving electrodes TE may be stably connected through the remaining bridge electrode CE. The driving electrodes TE adjacent to each other may be connected by two bridge electrodes CE, but the number of bridge electrodes CE is not limited thereto.

The bridge electrode CE may be disposed on a different layer from the plurality of driving electrodes TE and the plurality of sensing electrodes RE. The sensing electrodes RE adjacent to each other in the first direction (X-axis direction) may be electrically connected through a connection portion disposed on the same layer as the plurality of driving electrodes TE and the plurality of sensing electrodes RE, and the driving electrodes TE adjacent in the second direction (Y-axis direction) may be electrically connected through the bridge electrode CE disposed on a different layer from the plurality of driving electrodes TE or the plurality of sensing electrodes RE. Accordingly, although the bridge electrode CE overlaps the plurality of sensing electrodes RE in the Z-axis direction, the plurality of driving electrodes TE and the plurality of sensing electrodes RE may be insulated from each other. Mutual capacitance may be formed between the driving electrode TE and the sensing electrode RE.

The plurality of sensing electrodes RE may extend in the X-axis direction and may be spaced apart from each other in the Y-axis direction. The plurality of sensing electrodes RE may be arranged in the X-axis direction and the second direction (Y-axis direction), and the sensing electrodes RE adjacent in the X-axis direction may be electrically connected through the connection portion.

The plurality of sensing electrodes RE may be connected to the second touch pad unit TP2 through a sensing line RL. For example, some of the sensing electrodes RE disposed on the right side of the touch sensor area TSA may be connected to the second touch pad unit TP2 through the sensing line RL. The sensing line RL may extend to the second touch pad unit TP2 through the right side and the lower side of the touch peripheral area TPA. The second touch pad unit TP2 may be connected to the touch driver 400 through the circuit board 300.

Each of the plurality of dummy electrodes DME may be surrounded by the driving electrode TE or the sensing electrode RE. Each of the dummy electrodes DME may be insulated by being spaced apart from the driving electrode TE or the sensing electrode RE. Accordingly, the dummy electrode DME may be electrically floating.

Figure 7:
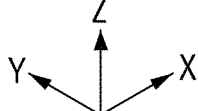
FIG. 7 is a diagram illustrating a touch driving process and charging of a touch input member in a touch sensing system according to one embodiment.
Figure 8:
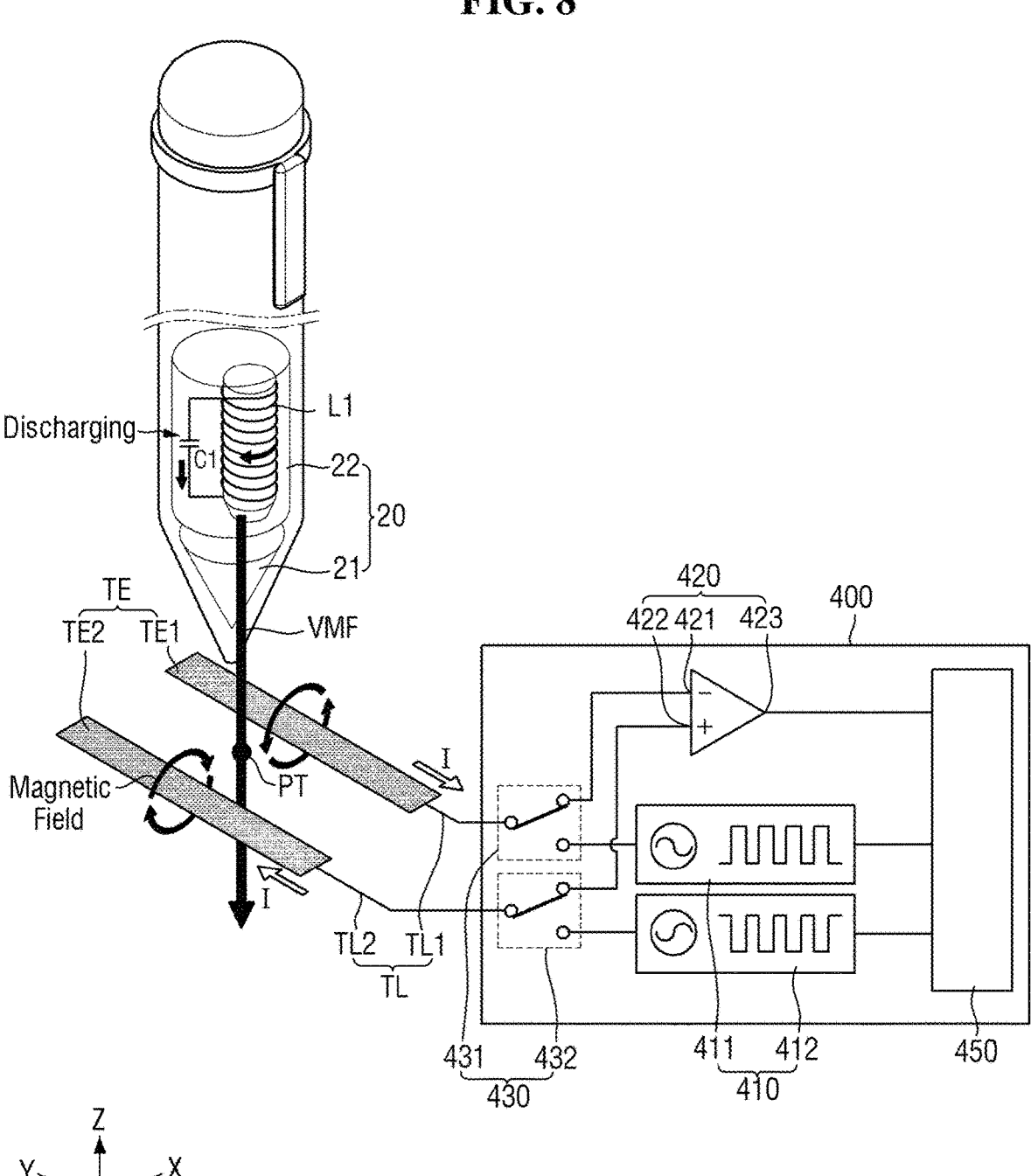
FIG. 8 is a diagram illustrating discharging of a touch input member and a touch sensing process in a touch sensing system according to one embodiment.
Figure 9:
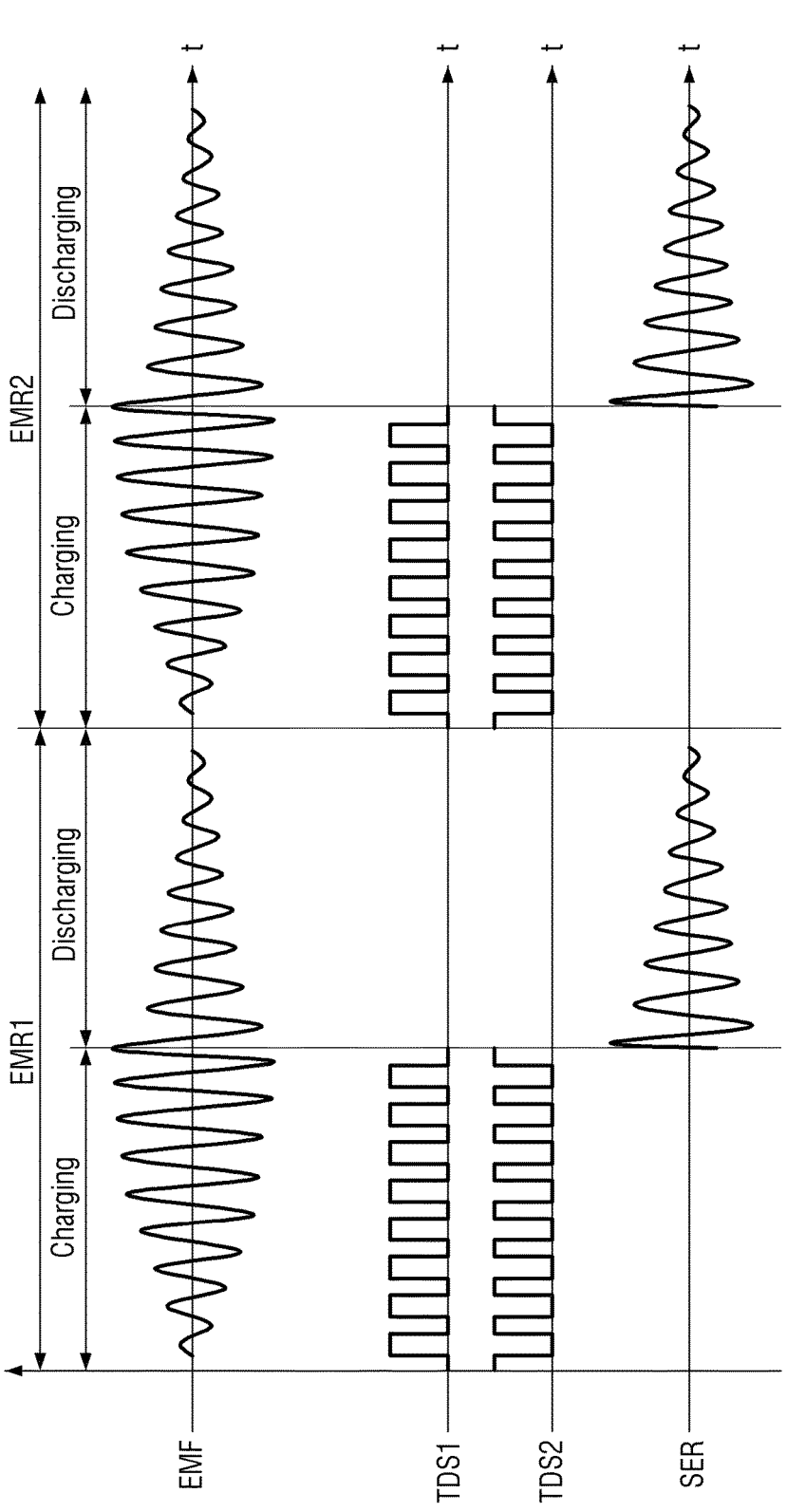
FIG. 9 is a waveform diagram illustrating an electromotive force of a touch input member, a touch driving signal, and a differential sensing signal in a touch sensing system according to one embodiment.

FIG. 7 is a diagram illustrating a touch driving process and charging of a touch input member in a touch sensing system according to one embodiment. FIG. 8 is a diagram illustrating discharging of a touch input member and a touch sensing process in a touch sensing system according to one embodiment. FIG. 9 is a waveform diagram illustrating an electromotive force of a touch input member, a touch driving signal, and a differential sensing signal in a touch sensing system according to one embodiment.

Referring to FIGS. 7 to 9, a touch sensing system may include the display device 10 and a touch input member 20. The display device 10 may include a display panel 100, a display driver 200, a circuit board 300, and a touch driver 400.

The touch driver 400 may include a driving signal supply unit 410, a sensing signal receiving unit 420, a switching unit 430, and a control unit 450.

The driving signal supply unit 410 may be electrically connected to the plurality of driving electrodes TE through the switching unit 430 and the driving line TL. The driving signal supply unit 410 may supply a touch driving signal to the plurality of driving electrodes TE during a charging period of an electromagnetic sensing period EMR. For example, the driving signal supply unit 410 may supply a touch driving signal to some of the plurality of driving electrodes TE. For another example, the driving signal supply unit 410 may sequentially supply a touch driving signal to the plurality of driving electrodes TE. The touch driving signal may be a signal having a plurality of driving pulses. The touch driving signal may be a sine wave, a pulse wave, or a ramp wave having a predetermined frequency, but is not limited thereto. The frequency of the touch driving signal may correspond to a resonant frequency of the touch input member 20. For example, the frequency of the touch driving signal may be the same as a resonant frequency of a resonant circuit unit 22 of the touch input member 20, but is not limited thereto. The touch driver 400 may sense the touch of the touch input member 20 by receiving a touch sensing signal of a specific frequency by the touch of the touch input member 20.

The driving signal supply unit 410 may include a first driving signal output module 411 and a second driving signal output module 412. The first driving signal output module 411 may supply a first touch driving signal TDS1 having a first phase to a first driving electrode TE1 through a first driving line TL1 during the charging period. The first driving electrode TE1 may be a driving electrode disposed to one side of a specific point PT among the plurality of driving electrodes TE. The second driving signal output module 412 may supply a second touch driving signal TDS2 having a second phase opposite to the first phase to a second driving electrode TE2 through a second driving line TL2 during the charging period. A difference between the first phase and the second phase may be 180 degrees. The second driving electrode TE2 may be a driving electrode disposed to the other side of the specific point PT among the plurality of driving electrodes TE. For example, the second driving electrode TE2 may be disposed adjacent to the first driving electrode TE1. For another example, the second driving electrode TE2 may be spaced apart from the first driving electrode TE1 with at least one driving electrode TE interposed therebetween.

For example, when the first driving electrode TE1 receives the first touch driving signal TDS1 having the first phase, a current I may flow in the Y-axis direction and a magnetic field may be generated clockwise with respect to the Y-axis direction. When the second driving electrode TE2 receives the second touch driving signal TDS2 having the second phase opposite to the first phase, a current I may flow in a direction opposite to the Y-axis direction, and a magnetic field may be generated counterclockwise with respect to the Y-axis direction. Accordingly, the directions of the magnetic fields of the first driving electrode TEL and the second driving electrode TE2 may coincide at the specific point PT, and thus, according to constructive interference of the magnetic fields, a magnetic field VMF may be generated in the Z-axis direction.

The touch input member 20 may be a stylus pen that supports an electromagnetic resonance method by using the driving electrode TE or the sensing electrode RE. The touch input member 20 may output a radio frequency signal in response to a magnetic field or electromagnetic signal of the touch sensing unit TSU.

The touch input member 20 may include a conductive tip 21 and the resonant circuit unit 22. The conductive tip 21 may be disposed on one end of the touch input member 20. The conductive tip 21 may form a capacitance with at least one of the plurality of touch electrodes SEN when the touch input member 20 touches the touch sensing unit TSU. The conductive tip 21 may be a dielectric including a metal material or conductive rubber, but is not limited thereto.

The resonant circuit unit 22 may include a coil L1 and a capacitor C1. The coil L1 may receive the magnetic field VMF formed in the third direction (Z-axis direction) induced by the touch sensing unit TSU to generate an induced current. The induced current flowing through the resonant circuit unit 22 may charge the capacitor C1. For example, an LC resonant frequency of the touch input member 20 may be determined based on the capacitance of the capacitor C1 and the inductance of the coil L1.

The touch input member 20 may be charged during the charging period of the electromagnetic sensing period EMR. When the touch input member 20 is adjacent to or in contact with the specific point PT, the touch input member 20 may receive the magnetic field VMF formed in the Z-axis direction induced from the current I flowing through the first and second driving electrodes TE1 and TE2 during the charging period. The coil L1 of the touch input member 20 may generate an induced current, and the induced current may charge the capacitor C1. Accordingly, an electromotive force EMF of the capacitor C1 may increase during the charging period.

The touch input member 20 may be discharged during a discharging period of the electromagnetic sensing period EMR. When the touch input member 20 is adjacent to or in contact with the specific point PT, if the supply of the magnetic field VMF formed in the third direction (Z-axis direction) is stopped by the interruption of the supply of the first and second touch driving signals TDS1 and TDS2, the capacitor C1 may be discharged. Accordingly, a current may flow in the coil L1 in a direction opposite to that of the induced current, and the coil L1 may generate the magnetic field VMF passing through the specific point PT in a direction opposite to the Z-axis direction. The electromotive force EMF of the capacitor C1 may decrease during the discharging period.

For example, when the magnetic field VMF passes through the specific point PT in a negative direction along the Z-axis, a magnetic field may be generated counterclockwise with respect to the Y-axis direction around the first driving electrode TE1, and the current I of the first driving electrode TE1 may flow in a direction opposite to the Y-axis direction. Accordingly, the first driving electrode TE1 may provide a first touch sensing signal having a first phase to the touch driver 400. When the magnetic field VMF passes through the specific point PT in a direction opposite to the Z-axis direction, a magnetic field may be generated clockwise with respect to the Y-axis direction around the second driving electrode TE2, and the current I of the second driving electrode TE2 may flow in the Y-axis direction. Accordingly, the second driving electrode TE2 may provide a second touch sensing signal having a second phase opposite to the first phase to the touch driver 400.

The sensing signal receiving unit 420 may be connected to the plurality of driving electrodes TE through the switching unit 430 and the driving line TL. The sensing signal receiving unit 420 may receive touch sensing signals of the plurality of driving electrodes TE through the driving line TL during the discharging period of the electromagnetic sensing period EMR. The sensing signal receiving unit 420 may be a differential amplifier. The sensing signal receiving unit 420 may differentially amplify the plurality of touch sensing signals to output a differential sensing signal SER. Here, differential amplification means amplifying a voltage difference between two input signals. Accordingly, the sensing signal receiving unit 420 may amplify a voltage difference between the plurality of touch sensing signals to output the differential sensing signal SER.

The sensing signal receiving unit 420 may include a first input terminal 421, a second input terminal 422, and an output terminal 423. When the touch input member 20 is adjacent to or in contact with the specific point PT, the first input terminal 421 may receive the first touch sensing signal having the first phase from the first driving electrode TE1 through the first driving line TL1, and the second input terminal 422 may receive the second touch sensing signal having the second phase opposite to the first phase from the second driving electrode TE2 through the second driving line TL2. The sensing signal receiving unit 420 may amplify a difference between the first and second touch sensing signals to output the differential sensing signal SER through the output terminal 423. The sensing signal receiving unit 420 may cancel noise included in the first and second touch sensing signals to remove them, and may amplify a difference between the first and second touch sensing signals to improve touch sensitivity.

The switching unit 430 may selectively connect the driving line TL to one of the driving signal supply unit 410 and the sensing signal receiving unit 420. The switching unit 430 may connect the driving signal supply unit 410 to the driving line TL during the charging period of the touch input member 20. The switching unit 430 may connect the sensing signal receiving unit 420 to the driving line TL during the discharging period of the touch input member 20. For example, the switching unit 430 may selectively connect each of the driving signal supply unit 410 and the sensing signal receiving unit 420 to the driving line TL. In another example, the switching unit 430 may selectively connect each of the driving signal supply unit 410 and the sensing signal receiving unit 420 to the driving line TL based on a control signal of the control unit 450.

The switching unit 430 may include a first switching unit 431 and a second switching unit 432. The first switching unit 431 may connect the first driving signal output module 411 to the first driving line TL1 during the charging period. The first driving signal output module 411 may supply the first touch driving signal TDS1 to the first driving electrode TE1 during the charging period.

The first switching unit 431 may connect the first input terminal 421 of the sensing signal receiving unit 420 to the first driving line TL1 during the discharging period. The first input terminal 421 may receive the first touch sensing signal from the first driving electrode TE1 during the discharging period.

The second switching unit 432 may connect the second driving signal output module 412 to the second driving line TL2 during the charging period. The second driving signal output module 412 may supply the second touch driving signal TDS2 to the second driving electrode TE2 during the charging period.

The second switching unit 432 may connect the second input terminal 422 of the sensing signal receiving unit 420 to the second driving line TL2 during the discharging period. The second input terminal 422 may receive the second touch sensing signal from the second driving electrode TE2 during the discharging period.

The control unit 450 may control the operation of the driving signal supply unit 410, the sensing signal receiving unit 420, and the switching unit 430. The control unit 450 may control the operation timing of the driving signal supply unit 410, the sensing signal receiving unit 420, and the switching unit 430 during the charging period and the discharging period of the electromagnetic sensing period EMR. For example, the control unit 450 may receive the differential sensing signal SER to determine whether the touch input member 20 touches the specific point PT. For another example, the control unit 450 may receive a plurality of differential sensing signals SER to determine the touch coordinates of the touch input member 20. When the frequency of the differential sensing signal SER corresponds to a preset frequency band, the control unit 450 may determine that the touch input member 20 has been touched, but the present disclosure is not limited thereto.

Accordingly, the touch driver 400 may supply the first and second touch driving signals TDS1 and TDS2 having opposite phases to the first and second driving electrodes TEL and TE2 disposed to both sides of the specific point PT, respectively, to generate the magnetic field VMF in the Z-axis direction by constructive interference of magnetic fields, thereby charging the touch input member 20. The touch driver 400 may differentially amplify the first and second touch sensing signals induced based on the magnetic field VMF formed in a negative direction along the Z-axis according to the discharge of the touch input member 20 to output the differential sensing signal SER, and may determine whether the touch input member 20 has been touched. The display device 10 may sense the touch of the touch input member 20 by using the touch sensing unit TSU that senses the touch of the user's body. Accordingly, the display device 10 may not include a separate sensor layer or a digitizer layer for the electromagnetic resonance of the touch input member 20, thereby reducing the thickness of the display device 10 and reducing cost.

Figure 10:
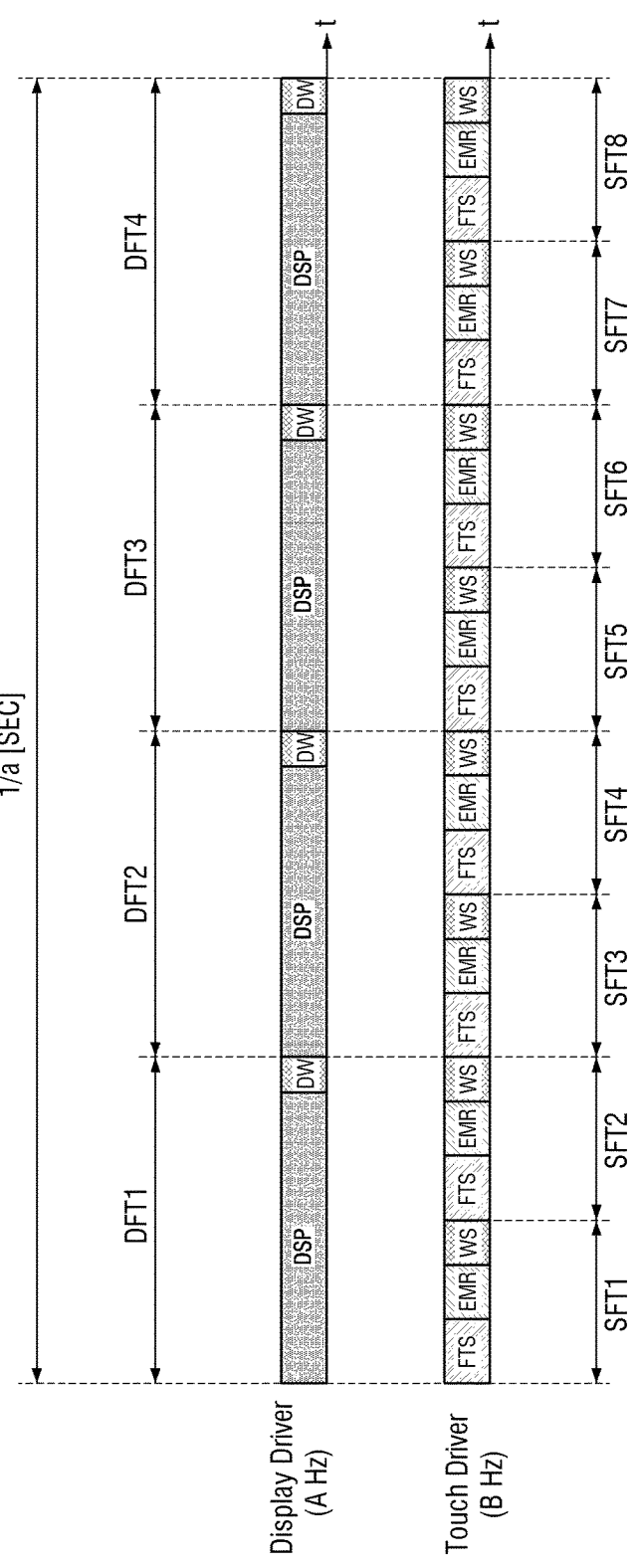
FIG. 10 is a timing diagram illustrating the operation of a display driver and a touch driver in a display device according to one embodiment.

FIG. 10 is a timing diagram illustrating the operation of a display driver and a touch driver in a display device according to one embodiment.

Referring to FIG. 10, the display driver 200 may drive the display unit DU at a driving frequency of A Hz (A being a positive integer). In a plurality of display frame periods DFT1, DFT2, DFT3, and DFT4, the display driver 200 may supply a gate signal and a data voltage to the plurality of pixels during a display period DSP, and may stop the supply of the gate signal and the data voltage during a display standby period DW. First to fourth display frame periods DFT1, DFT2, DFT3, and DFT4 may correspond to 1/a sec (a being a positive integer). For example, the display driver 200 may sequentially supply a gate signal to the pixels arranged along a plurality of rows during the display period DSP in the first display frame period DFT1, and the plurality of pixels may display images in an order selected by the gate signal. The display driver 200 may not supply the gate signal and the data voltage to the plurality of pixels during the display standby period DW in the first display frame period DFT1, and voltages in the plurality of pixels may be initialized.

The touch driver 400 may be synchronized with the display driver 200 to drive the touch sensing unit TSU. The touch driver 400 may receive a timing control signal from a main processor or a main controller (not shown), and may be synchronized with the display driver 200. For example, the touch driver 400 may drive the touch sensing unit TSU at a driving frequency of N times (N being a positive integer) the driving frequency of the display driver 200, but is not limited thereto.

The touch driver 400 may drive the touch sensing unit TSU at a driving frequency of B Hz (B being a positive integer). The touch driver 400 may drive the touch sensing unit TSU during a plurality of touch frame periods SFT1 to SFT8 determined by the driving frequency. The touch driver 400 may sense the touch of the user's body during a touch sensing period FTS in a first touch frame period SFT1, may sense the touch of the touch input member 20 during the electromagnetic sensing period EMR, and may stop the supply of the touch driving signal during a touch standby period WS. Referring to FIG. 10 in conjunction with FIG. 9, the electromagnetic sensing period EMR may include a plurality of electromagnetic sensing periods EMR1, EMR2, . . . . For example, during the touch sensing period FTS, the touch driver 400 may supply a touch driving signal to the plurality of driving electrodes TE and receive a touch sensing signal from the plurality of sensing electrodes RE to sense an amount of change in mutual capacitance between the driving electrode TE and the sensing electrode RE. During the electromagnetic sensing period EMR, the touch driver 400 may supply the first and second touch driving signals TDS1 and TDS2 and receive the first and second touch sensing signals to determine whether the touch input member 20 has been touched. Accordingly, the touch driver 400 may sense both the touch of the user's body and the touch of the touch input member 20 during the first touch frame period SFT1.

The touch driver 400 may sequentially perform the touch sensing period FTS, the electromagnetic sensing period EMR, and the touch standby period WS during the first touch frame period SFT1, but the order of the touch method is not limited thereto. The length of the touch sensing period FTS may be greater than the length of the electromagnetic sensing period EMR, but the present disclosure is not limited thereto.

Figure 11:
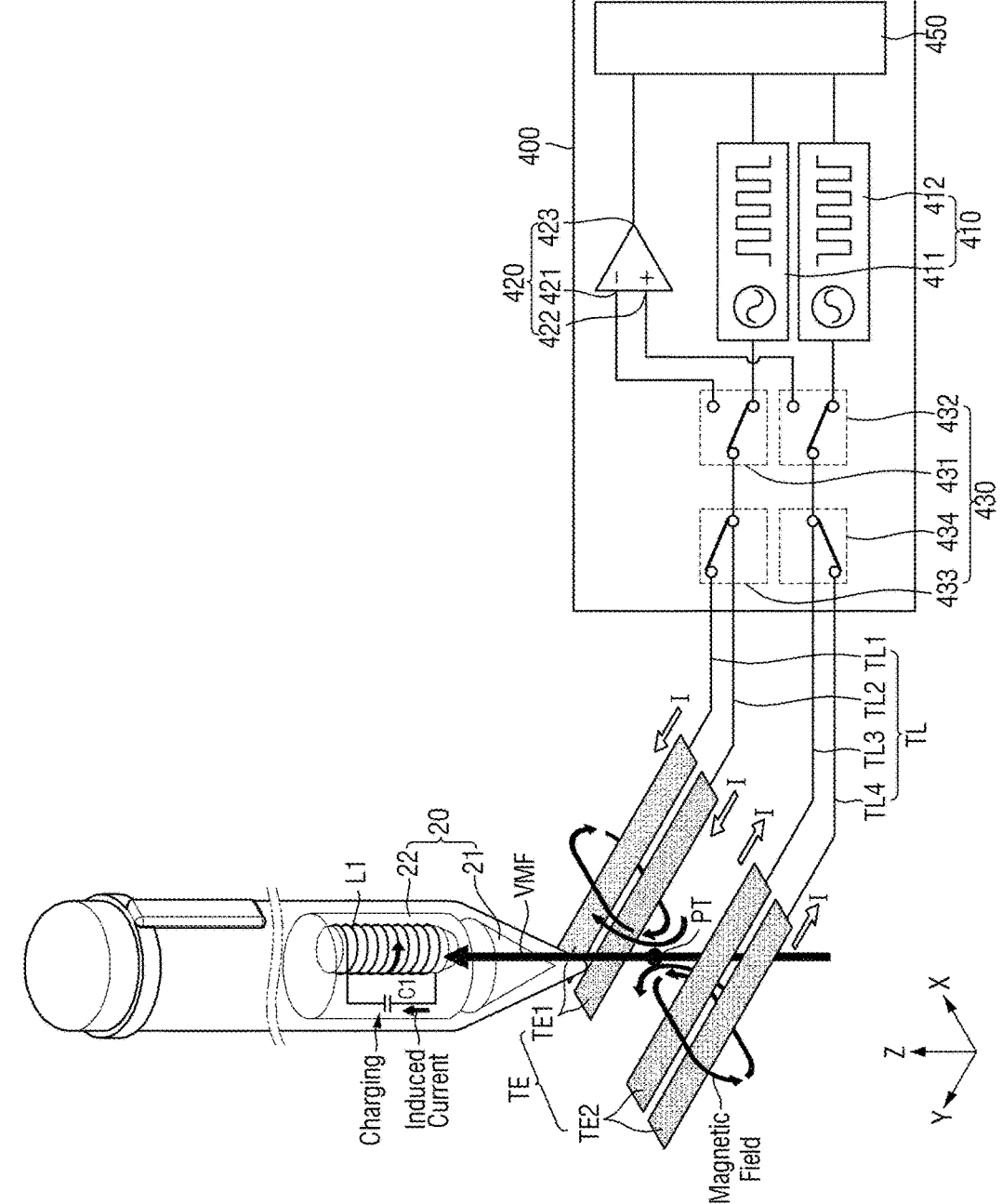
FIG. 11 is a diagram illustrating a touch driving process and charging of a touch input member in a touch sensing system according to another embodiment.
Figure 12:
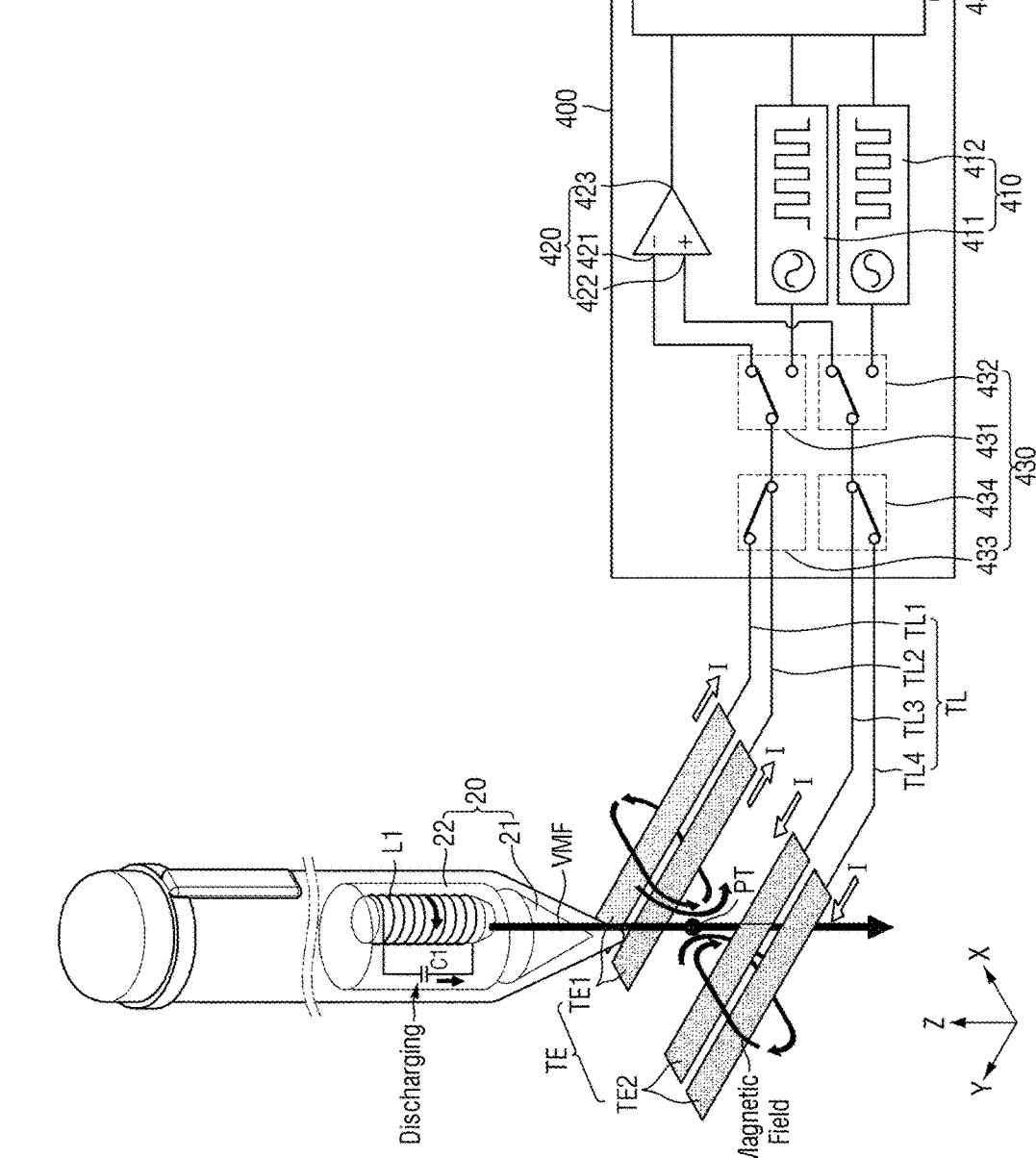
FIG. 12 is a diagram illustrating discharging of a touch input member and a touch sensing process in a touch sensing system according to another embodiment.

FIG. 11 is a diagram illustrating a touch driving process and charging of a touch input member in a touch sensing system according to another embodiment. FIG. 12 is a diagram illustrating discharging of a touch input member and a touch sensing process in a touch sensing system according to another embodiment. Hereinafter, the same configurations as the above-described configurations will be briefly described, or a description thereof will be omitted.

Referring to FIGS. 11 and 12, the touch driver 400 may include the driving signal supply unit 410, the sensing signal receiving unit 420, the switching unit 430, and the control unit 450.

The driving signal supply unit 410 may supply a touch driving signal to a plurality of driving electrodes TE during the charging period of the electromagnetic sensing period EMR. The driving signal supply unit 410 may include the first driving signal output module 411 and the second driving signal output module 412. The first driving signal output module 411 may supply a first touch driving signal TDS1 having a first phase to first driving electrodes TE1 through first and second driving lines TL1 and TL2 during the charging period. The first driving electrodes TE1 may be driving electrodes disposed to one side of a specific point PT among the plurality of driving electrodes TE.

The second driving signal output module 412 may supply a second touch driving signal TDS2 having a second phase opposite to the first phase second driving electrodes TE2 through third and fourth driving lines TL3 and TL4 during the charging period. A difference between the first phase and the second phase may be 180 degrees. The second driving electrodes TE2 may be driving electrodes disposed across the specific point PT from the first driving electrodes TE1. In some embodiments, a plurality of second driving electrodes TE2 may be disposed adjacent to one another.

For example, when the first driving electrodes TE1 receive the first touch driving signal TDS1 having the first phase, a current I may flow in the Y-axis direction and a magnetic field may be generated clockwise with respect to the Y-axis direction. When the second driving electrodes TE2 receive the second touch driving signal TDS2 having the second phase opposite to the first phase, a current I may flow in a negative direction in the Y-axis, and a magnetic field may be generated counterclockwise with respect to the Y-axis direction. Accordingly, the directions of the magnetic fields of the first and second driving electrodes TE1 and TE2 may coincide at the specific point PT, and thus, according to constructive interference of the magnetic fields, a magnetic field VMF may be generated in the Z-axis direction. The touch driver 400 of FIG. 11 may use the first and second driving electrodes TE1 and TE2 to generate the magnetic field VMF in the Z-axis direction, which may be stronger than the magnetic field VMF of the touch driver 400 of FIG. 7 that uses one each of the first and second driving electrodes TE1 and TE2.

The touch input member 20 may be charged during the charging period of the electromagnetic sensing period EMR. When the touch input member 20 is adjacent to or in contact with the specific point PT, the touch input member 20 may receive the magnetic field VMF formed in the Z-axis direction induced from the current I flowing through the first and second driving electrodes TE1 and TE2 during the charging period. The coil L1 of the touch input member 20 may generate an induced current, and the induced current may charge the capacitor C1. The electromotive force EMF of the capacitor C1 may increase during the charging period. Since the electromotive force EMF of the capacitor C1 of FIG. 11 is induced by a relatively strong magnetic field VMF, it may be greater than the electromotive force EMF of the capacitor C1 of FIG. 7. Accordingly, the touch sensitivity of the touch driver 400 of FIGS. 11 and 12 may be improved compared to the touch sensitivity of the touch driver 400 of FIGS. 7 and 8.

The touch input member 20 may be discharged during the discharging period of the electromagnetic sensing period EMR. When the touch input member 20 is adjacent to or in contact with the specific point PT, if the supply of the magnetic field VMF formed in the third direction (Z-axis direction) is stopped, the capacitor C1 may be discharged. Accordingly, a current may flow in the coil L1 in a direction opposite to that of the induced current, and the coil L1 may generate the magnetic field VMF passing through the specific point PT in a negative direction along the Z-axis. The electromotive force EMF of the capacitor C1 may decrease during the discharging period.

For example, when the magnetic field VMF passes through the specific point PT in a negative direction along the Z-axis, a magnetic field may be generated counterclockwise with respect to the Y-axis direction around the first and driving electrodes TE1, and the current I of the first driving electrodes TE1 may flow in a direction opposite to the Y-axis direction. Accordingly, the first driving electrodes TE1 may provide a first touch sensing signal having a first phase to the touch driver 400. When the magnetic field VMF passes through the specific point PT in a negative direction along the Z-axis, a magnetic field may be generated clockwise with respect to the Y-axis around the second driving electrodes TE2, and the current I of the second driving electrodes TE2 may flow in the Y-axis direction. Accordingly, the second driving electrodes TE2 may provide a second touch sensing signal having a second phase opposite to the first phase to the touch driver 400.

The sensing signal receiving unit 420 may include the first input terminal 421, the second input terminal 422, and the output terminal 423. When the touch input member 20 is adjacent to or in contact with the specific point PT, the first input terminal 421 may receive the first touch sensing signal having the first phase from the first driving electrodes TE1 through the first and second driving lines TL1 and TL2, and the second input terminal 422 may receive the second touch sensing signal having the second phase opposite to the first phase from the second driving electrodes TE2 through the third and fourth driving lines TL3 and TL4. The sensing signal receiving unit 420 may amplify a difference between the first and second touch sensing signals to output the differential sensing signal SER through the output terminal 423. The sensing signal receiving unit 420 may cancel noise included in the first and second touch sensing signals to remove them, and may amplify a difference between the first and second touch sensing signals to improve touch sensitivity.

The switching unit 430 may include first to fourth switching units 431, 432, 433, and 434. The first switching unit 431 may connect the first driving signal output module 411 to the first and second driving lines TL1 and TL2 during the charging period. The first driving signal output module 411 may supply the first touch driving signal TDS1 to the first and second driving electrodes TE1 and TE2 during the charging period.

The first switching unit 431 may connect the first input terminal 421 of the sensing signal receiving unit 420 to the first and second driving lines TL1 and TL2 during the discharging period. The first input terminal 421 may receive the first touch sensing signal from the first driving electrodes TE1 during the discharging period.

The second switching unit 432 may connect the second driving signal output module 412 to the third and fourth driving lines TL3 and TL4 during the charging period. The second driving signal output module 412 may supply the second touch driving signal TDS2 to the second driving electrodes TE2 during the charging period.

The second switching unit 432 may connect the second input terminal 422 of the sensing signal receiving unit 420 to the third and fourth driving lines TL3 and TL4 during the discharging period. The second input terminal 422 may receive the second touch sensing signal from the second driving electrodes TE2 during the discharging period.

The third switching unit 433 may group the first and second driving electrodes TE1 by connecting them during the charging period or the discharging period. The fourth switching unit 434 may group the second driving electrodes TE2 by connecting them during the charging period or the discharging period. During the charging period, the first driving electrodes TE1 may be connected by the third switching unit 433 to receive the first touch driving signal TDS1. During the charging period, the second driving electrodes TE2 may be connected by the fourth switching unit 434 to receive the second touch driving signal TDS2. Accordingly, the touch driver 400 that uses the first and second driving electrodes TE1, TE2, may generate, in the Z-axis direction, the magnetic field VMF stronger than that of the touch driver 400 that uses only one each of the first and second driving electrodes TE1 and TE2.

During the discharging period, the first driving electrodes TE1 may be connected by the third switching unit 433 to supply the first touch sensing signal to the sensing signal receiving unit 420. During the discharging period, the second driving electrodes TE2 may be connected by the fourth switching unit 434 to supply the second touch sensing signal to the sensing signal receiving unit 420. Accordingly, the touch driver 400 that uses a plurality of the first and second driving electrodes TE1, TE2 may receive the first and second touch sensing signals stronger than those of the touch driver 400 that uses only one each of the first and second driving electrodes TE1 and TE2, and may improve the output of the differential sensing signal SER.

For example, each of the third and fourth switching units 433 and 434 may group two driving electrodes TE during the charging period and may group two driving electrodes TE during the discharging period, but is not limited thereto. Each of the third and fourth switching units 433 and 434 may group three or more driving electrodes TE to increase the strength of the magnetic field VMF formed in the Z-axis direction.

For another example, each of the third and fourth switching units 433 and 434 may group N (hereinafter, N being a positive integer) driving electrodes TE during the charging period, and may group M (hereinafter, M being a positive integer different from N) driving electrodes TE during the discharging period. Therefore, each of the third and fourth switching units 433 and 434 may control the strength of the magnetic field VMF formed in the Z-axis direction by grouping N driving electrodes TE during the charging period, and may control the output of the differential sensing signal SER by grouping M driving electrodes TE during the discharging period.

Figure 13:
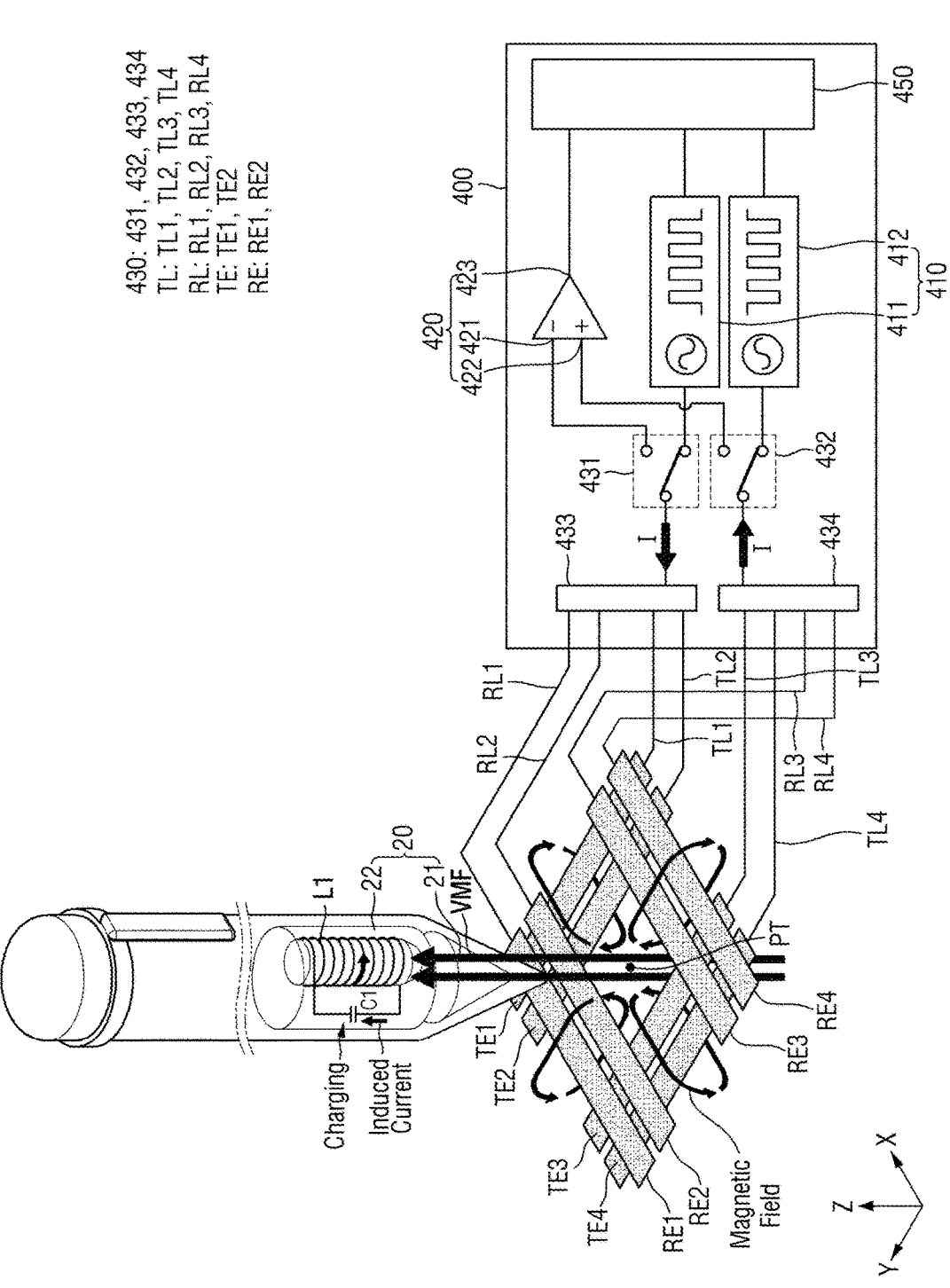
FIG. 13 is a diagram illustrating a touch driving process and charging of a touch input member in a touch sensing system according to still another embodiment.
Figure 14:
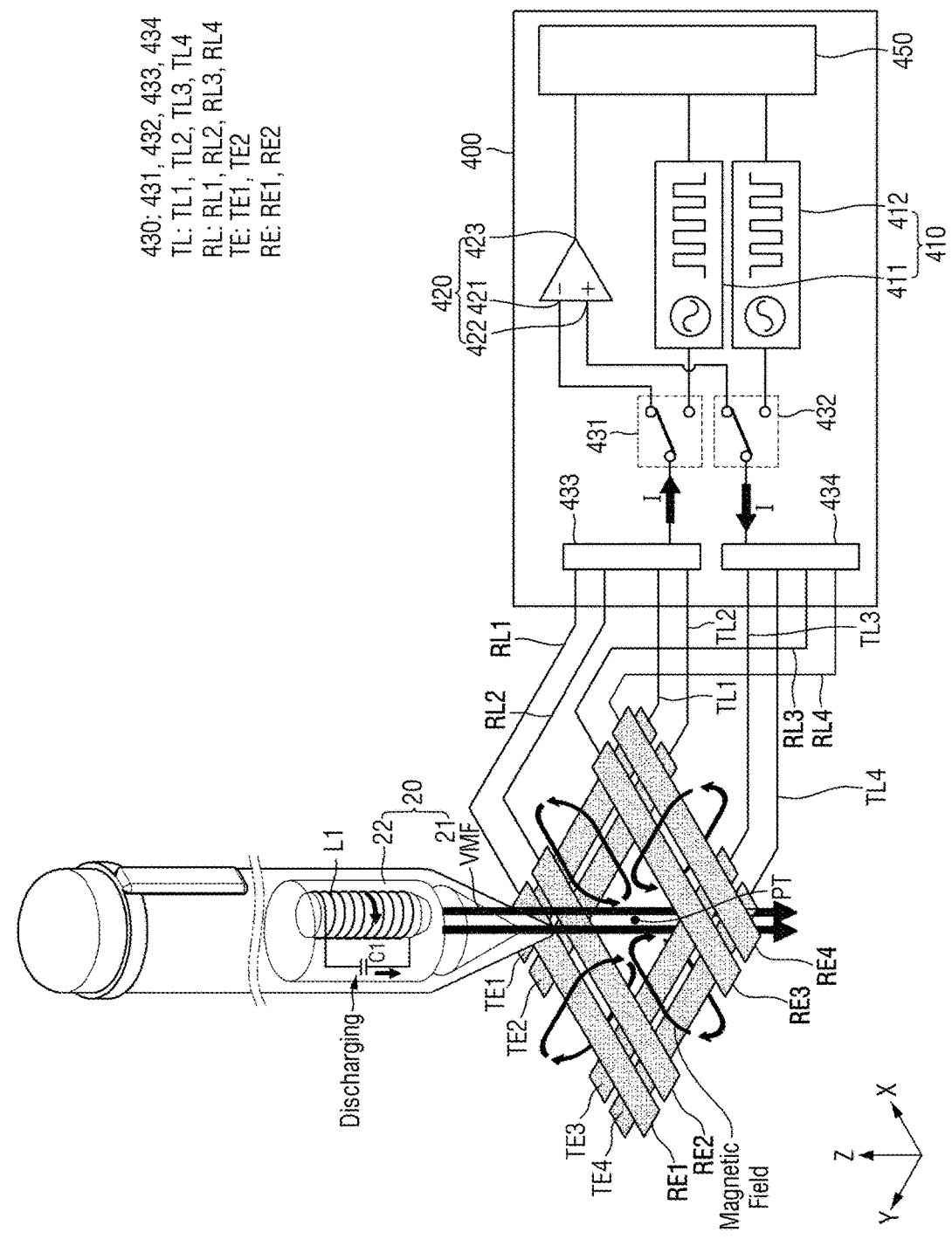
FIG. 14 is a diagram illustrating discharging of a touch input member and a touch sensing process in a touch sensing system according to still another embodiment.

FIG. 13 is a diagram illustrating a touch driving process and charging of a touch input member in a touch sensing system according to still another embodiment. FIG. 14 is a diagram illustrating discharging of a touch input member and a touch sensing process in a touch sensing system according to still another embodiment.

Referring to FIGS. 13 and 14, the touch driver 400 may include the driving signal supply unit 410, the sensing signal receiving unit 420, the switching unit 430, and the control unit 450.

The driving signal supply unit 410 may supply a touch driving signal to a plurality of driving electrodes TE and a plurality of sensing electrodes RE during the charging period of the electromagnetic sensing period EMR. The driving signal supply unit 410 may include the first driving signal output module 411 and the second driving signal output module 412. During the charging period, the first driving signal output module 411 may supply a first touch driving signal TDS1 having a first phase to first driving electrodes TE1 through first and second driving lines TL1 and TL2, and to first d sensing electrodes RE1 through first and second sensing lines RL1 and RL2. The first driving electrodes TE1 may be driving electrodes disposed to extend in the first direction (X-axis direction) with respect to a specific point PT, and the first sensing electrodes RE1 may be sensing electrodes disposed in the second direction (Y-axis direction) with respect to the specific point PT.

During the charging period, the second driving signal output module 412 may supply a second touch driving signal TDS2 having a second phase opposite to the first phase to second driving electrodes TE2 through third and fourth driving lines TL3 and TL4, and to second sensing electrodes RE2 through third and fourth sensing lines RL3 and RL4. A difference between the first phase and the second phase may be 180 degrees. The second driving electrodes TE2 may be driving electrodes disposed across, or on the other side of, the specific point PT from the first driving electrodes TE1, and the second sensing electrodes RE2 may be sensing electrodes disposed across, or on the other side of, the specific point PT from the first sensing electrodes RE1. In one embodiment, one of the first driving electrodes TE1 may be disposed adjacent to one of the second driving electrodes TE2, and one of the first sensing electrodes RE1 may be disposed adjacent to one of the second sensing electrode RE2. In another embodiment, one of the first driving electrodes TE1 may be spaced apart from the nearest one of the second driving electrodes TE2 with at least one driving electrode TE interposed therebetween, and one of the first sensing electrode RE1 may be spaced apart from the nearest one of the second sensing electrodes RE2 with at least one sensing electrode RE interposed therebetween.

For example, when the first driving electrodes TE1 receive the first touch driving signal TDS1 having the first phase, a current I may flow in the second direction (Y-axis direction), and a magnetic field may be generated clockwise with respect to the second direction (Y-axis direction). When the first sensing electrodes RE1 receive the first touch driving signal TDS1 having the first phase, a current I may flow in a direction opposite to the first direction (X-axis direction), and a magnetic field may be generated counterclockwise with respect to the first direction (X-axis direction). When the second driving electrodes TE2 receive the second touch driving signal TDS2 having the second phase opposite to the first phase, a current I may flow in a direction opposite to the second direction (Y-axis direction), and a magnetic field may be generated counterclockwise with respect to the second direction (Y-axis direction). When the second sensing electrodes RE2 receive the second touch driving signal TDS2 having the second phase, a current I may flow in the first direction (X-axis direction) and a magnetic field may be generated clockwise with respect to the first direction (X-axis direction). Accordingly, the directions of the magnetic fields of the first and second driving electrodes TE1, TE2, may coincide with the directions of the magnetic fields of the first and second sensing electrodes RE1, RE2, at the specific point PT. Thus, according to constructive interference of the magnetic fields, a magnetic field VMF may be generated in the third direction (Z-axis direction). The touch driver 400 of FIG. 13 may use two of the first to driving electrodes TE1 and two of the second driving electrodes TE2, two of the first sensing electrodes RE1 and two of the second sensing electrodes RE2 to generate the magnetic field VMF in the third direction (Z-axis direction), which may be stronger than the magnetic field VMF of the touch driver 400 of FIG. 7 or the touch driver 400 of FIG. 11.

The touch input member 20 may be charged during the charging period of the electromagnetic sensing period EMR. When the touch input member 20 is adjacent to or in contact with the specific point PT, the touch input member 20 may receive the magnetic field VMF formed in the third direction (Z-axis direction) induced from the current I flowing through the first and second driving electrodes TE1 and TE2 and the first and second sensing electrodes RE1 and RE2, during the charging period. The coil L1 of the touch input member 20 may generate an induced current, and the induced current may charge the capacitor C1. The electromotive force EMF of the capacitor C1 may increase during the charging period. Since the electromotive force EMF of the capacitor C1 of FIG. 13 is induced by a relatively strong magnetic field VMF, it may be greater than the electromotive force EMF of the capacitor C1 of FIG. 7 or the capacitor C1 of FIG. 11. Accordingly, the touch sensitivity of the touch driver 400 of FIGS. 13 and 14 may be improved compared to the touch sensitivity of the touch driver 400 of FIGS. 7 and 8 or the touch driver 400 of FIGS. 11 and 12.

The touch input member 20 may be discharged during the discharging period of the electromagnetic sensing period EMR. When the touch input member 20 is adjacent to or in contact with the specific point PT, if the supply of the magnetic field VMF formed in the third direction (Z-axis direction) is stopped, the capacitor C1 may be discharged. Accordingly, a current may flow in the coil L1 in a direction opposite to that of the induced current, and the coil L1 may generate the magnetic field VMF passing through the specific point PT in a direction opposite to the third direction (Z-axis direction). The electromotive force EMF of the capacitor C1 may decrease during the discharging period.

For example, when the magnetic field VMF passes through the specific point PT in a direction opposite to the third direction (Z-axis direction), a magnetic field may be generated counterclockwise with respect to the second direction (Y-axis direction) around the first driving electrodes TE1, and the current I of the first driving electrodes TE1 may flow in a negative direction along the Y-axis. When the magnetic field VMF passes through the specific point PT in a negative direction along the Z-axis, a magnetic field may be generated clockwise with respect to the first direction (X-axis direction) around the first sensing electrodes RE1, and the current I of the first sensing electrodes RE1 may flow in the first direction (X-axis direction). Accordingly, the first driving electrodes TE1 and the first sensing electrodes RE1 may provide a first touch sensing signal having a first phase to the touch driver 400.

When the magnetic field VMF passes through the specific point PT in a direction opposite to the third direction (Z-axis direction), a magnetic field may be generated clockwise with respect to the second direction (Y-axis direction) around the second driving electrodes TE2, and the current I of the second driving electrodes TE2 may flow in the second direction (Y-axis direction). When the magnetic field VMF passes through the specific point PT in a negative direction along the third direction (Z-axis direction), a magnetic field may be generated counterclockwise with respect to the first direction (X-axis direction) around the second sensing electrodes RE2, and the current I of the second sensing electrodes RE2 may flow in a negative direction along the first direction (X-axis direction). Accordingly, the second driving electrodes TE2 and the second sensing electrodes RE2 may provide a second touch sensing signal having a second phase opposite to the first phase to the touch driver 400.

The sensing signal receiving unit 420 may include the first input terminal 421, the second input terminal 422, and the output terminal 423. When the touch input member 20 is adjacent to or in contact with the specific point PT, the first input terminal 421 may receive the first touch sensing signal having the first phase from the first driving electrodes TE1 and the first and sensing electrodes RE1. When the touch input member 20 is adjacent to or in contact with the specific point PT, the second input terminal 422 may receive the second touch sensing signal having the second phase opposite to the first phase from the second driving electrodes TE2 and the second sensing electrodes RE2. The sensing signal receiving unit 420 may amplify a difference between the first and second touch sensing signals to output the differential sensing signal SER through the output terminal 423. The sensing signal receiving unit 420 may cancel noise included in the first and second touch sensing signals to remove them, and may amplify a difference between the first and second touch sensing signals to improve touch sensitivity.

The switching unit 430 may include first to fourth switching units 431, 432, 433, and 434. The first switching unit 431 may connect the first driving signal output module 411 to the first and second driving lines TL1 and TL2 and the first and second sensing lines RL1 and RL2 during the charging period. The first driving signal output module 411 may supply the first touch driving signal TDS1 to the first driving electrodes TE1 and the first sensing electrodes RE1 during the charging period.

The first switching unit 431 may connect the first input terminal 421 of the sensing signal receiving unit 420 to the first and second driving lines TL1 and TL2 and the first and second sensing lines RL1 and RL2 during the discharging period. The first input terminal 421 may receive the first touch sensing signal from the first driving electrodes TE1 and the first sensing electrodes RE1 during the discharging period.

The second switching unit 432 may connect the second driving signal output module 412 to the third and fourth driving lines TL3 and TL4 and the third and fourth sensing lines RL3 and RL4 during the charging period. The second driving signal output module 412 may supply the second touch driving signal TDS2 to the second driving electrodes TE2 and the second sensing electrodes RE2 during the charging period.

The second switching unit 432 may connect the second input terminal 422 of the sensing signal receiving unit 420 to the third and fourth driving lines TL3 and TL4 and the third and fourth sensing lines RL3 and RL4 during the discharging period. The second input terminal 422 may receive the second touch sensing signal from second driving electrodes TE2 and the second sensing electrodes RE2 during the discharging period.

The third switching unit 433 may group the first driving electrodes TE1 and the first sensing electrodes RE1 by connecting them during the charging period or the discharging period. The fourth switching unit 434 may group the second driving electrodes TE2 and the second sensing electrodes RE2 by connecting them during the charging period or the discharging period. During the charging period, the first driving electrodes TE1 and the first sensing electrodes RE1 may be connected by the third switching unit 433 to receive the first touch driving signal TDS1. During the charging period, the second driving electrodes TE2 and the second sensing electrodes RE2 may be connected by the fourth switching unit 434 to receive the second touch driving signal TDS2. Accordingly, the touch driver 400 that uses the plurality of driving electrodes TE and the plurality of sensing electrodes RE may generate, in the third direction (Z-axis direction), the magnetic field VMF stronger than that of the touch driver 400 that uses the plurality of driving electrodes TE.

During the discharging period, the first driving electrodes TE1 and the first sensing electrodes RE1 may be connected by the third switching unit 433 to supply the first touch sensing signal to the sensing signal receiving unit 420. During the discharging period, the second driving electrodes TE2 and the second sensing electrodes RE2 may be connected by the fourth switching unit 434 to supply the second touch sensing signal to the sensing signal receiving unit 420. Accordingly, the touch driver 400 that uses the plurality of driving electrodes TE and the plurality of sensing electrodes RE may receive the first and second touch sensing signals stronger than those of the touch driver 400 that uses only driving electrodes TE, and may improve the output of the differential sensing signal SER.

The control unit 450 may receive the differential sensing signal SER to determine the touch coordinates of the touch input member 20. The control unit 450 may determine the X-axis coordinate of the touch coordinates by analyzing the differential sensing signal SER by some of the plurality of driving electrodes TE, and may determine the Y-axis coordinate of the touch coordinates by analyzing the differential sensing signal SER by some of the plurality of sensing electrodes RE. For example, the control unit 450 may determine the X-axis coordinate of the specific point PT based on the positions of the first and second driving electrodes TE1, TE2, located around the specific point PT, and may determine the Y-axis coordinate of the specific point PT based on the positions of the first and second sensing electrodes RE1, RE2.

Figure 15:
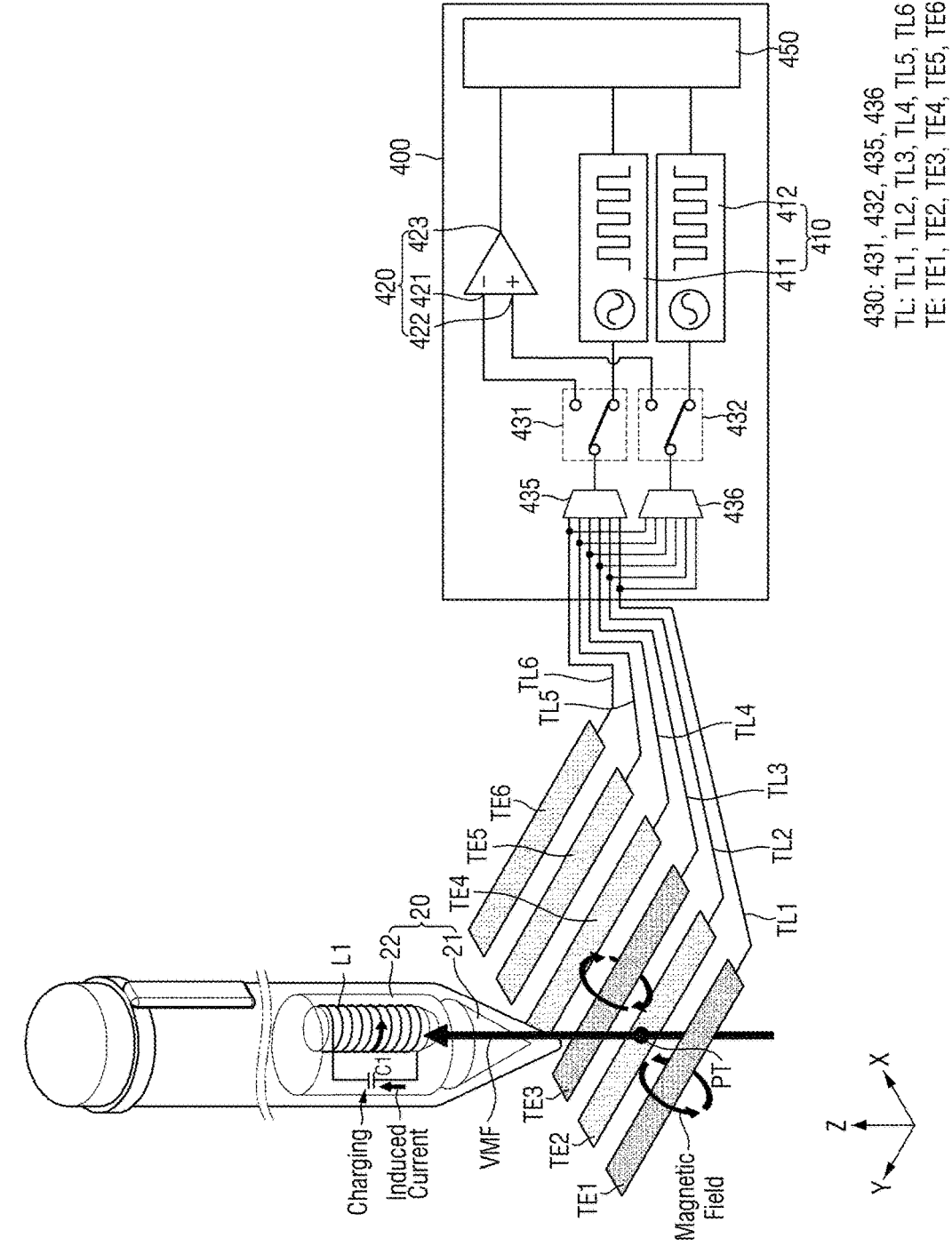
FIG. 15 is a diagram illustrating a touch driving process and charging of a touch input member in a touch sensing system according to still another embodiment.
Figure 16:
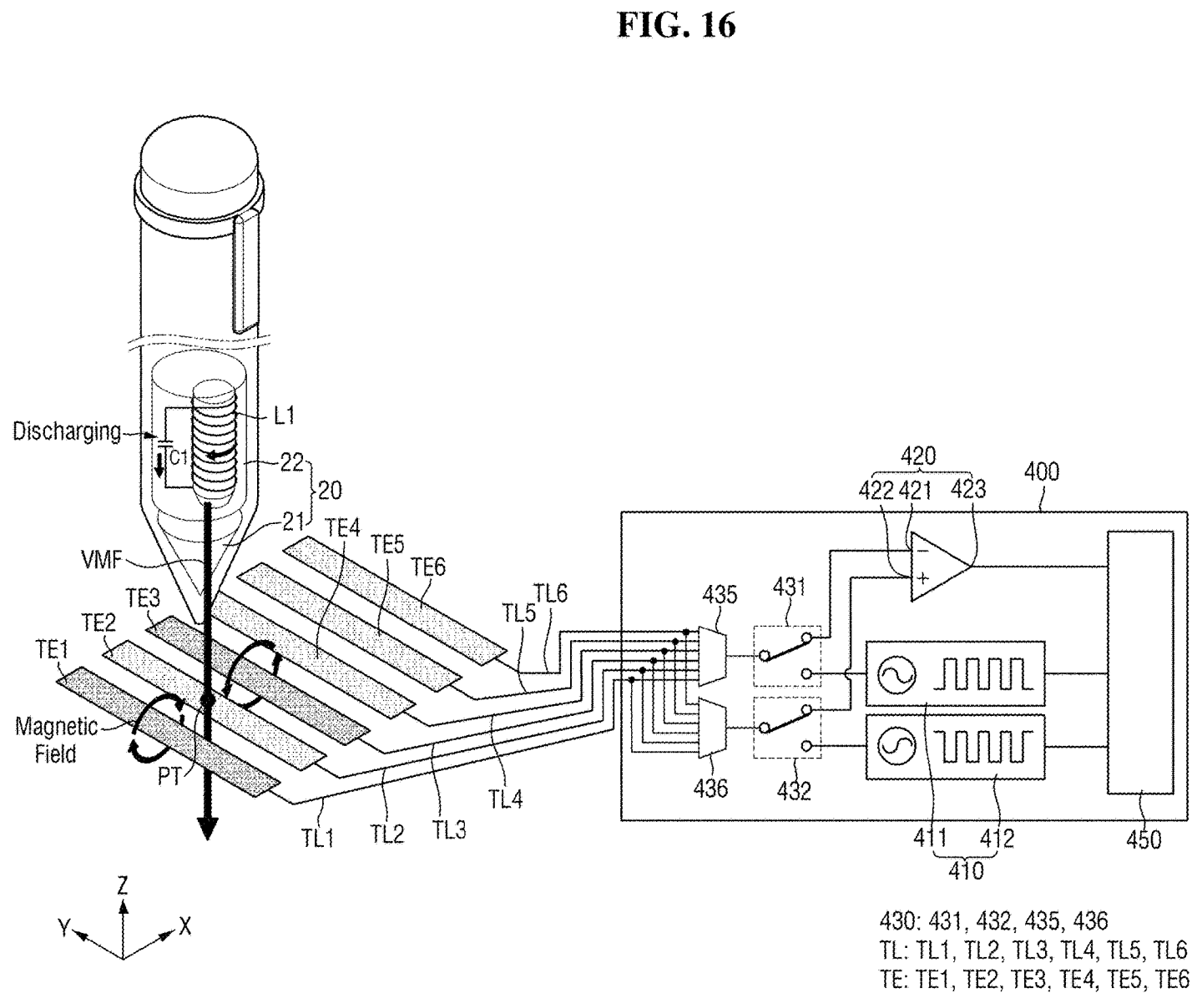

FIG. 15 is a diagram illustrating a touch driving process and charging of a touch input member in a touch sensing system according to still another embodiment. FIG. 16 is a diagram illustrating discharging of a touch input member and a touch sensing process in a touch sensing system according to still another embodiment.

Referring to FIGS. 15 and 16, the touch driver 400 may include the driving signal supply unit 410, the sensing signal receiving unit 420, the switching unit 430, and the control unit 450.

The driving signal supply unit 410 may supply a touch driving signal to a plurality of driving electrodes TE during the charging period of the electromagnetic sensing period EMR. The driving signal supply unit 410 may include the first driving signal output module 411 and the second driving signal output module 412. The first driving signal output module 411 may supply a first touch driving signal TDS1 having a first phase to a third driving electrode TE3 of first to sixth driving electrodes TE1 to TE6 during the charging period. The third driving electrode TE3 may be a driving electrode disposed to one side of a specific point PT among the plurality of driving electrodes TE.

The second driving signal output module 412 may supply a second touch driving signal TDS2 having a second phase opposite to the first phase to the first driving electrode TE1 of the first to sixth driving electrodes TE1 to TE6 during the charging period. The first driving electrode TE1 may be a driving electrode disposed across the specific point PT from the remaining driving electrodes TE. Accordingly, each of the first and second driving signal output modules 411 and 412 may selectively supply the first and second touch driving signals to at least one driving electrode TE.

The touch input member 20 may be charged during the charging period of the electromagnetic sensing period EMR. When the touch input member 20 is adjacent to or in contact with the specific point PT, the touch input member 20 may receive a magnetic field VMF formed in the third direction (Z-axis direction) induced from a current I flowing through the first and third driving electrodes TE1 and TE3 during the charging period. The coil L1 of the touch input member 20 may generate an induced current, and the induced current may charge the capacitor C1. The electromotive force EMF of the capacitor C1 may increase during the charging period.

The touch input member 20 may be discharged during the discharging period of the electromagnetic sensing period EMR. When the touch input member 20 is adjacent to or in contact with the specific point PT, if the supply of the magnetic field VMF formed in the third direction (Z-axis direction) is stopped, the capacitor C1 may be discharged. Accordingly, a current may flow in the coil L1 in a direction opposite to that of the induced current, and the coil L1 may generate the magnetic field VMF passing through the specific point PT in a direction opposite to the third direction (Z-axis direction). The electromotive force EMF of the capacitor C1 may decrease during the discharging period.

For example, when the magnetic field VMF passes through the specific point PT in a direction opposite to the third direction (Z-axis direction), a magnetic field may be generated counterclockwise with respect to the second direction (Y-axis direction) around the third driving electrode TE3, and the current I of the third driving electrode TE3 may flow in a direction opposite to the second direction (Y-axis direction). Accordingly, the third driving electrode TE3 may provide a first touch sensing signal having a first phase to the touch driver 400. When the magnetic field VMF passes through the specific point PT in a direction opposite to the third direction (Z-axis direction), a magnetic field may be generated clockwise with respect to the second direction (Y-axis direction) around the first driving electrode TE1, and the current I of the first driving electrode TE1 may flow in the second direction (Y-axis direction). Accordingly, the first driving electrode TE1 may provide a second touch sensing signal having a second phase opposite to the first phase to the touch driver 400.

The sensing signal receiving unit 420 may include the first input terminal 421, the second input terminal 422, and the output terminal 423. When the touch input member 20 is adjacent to or in contact with the specific point PT, the first input terminal 421 may receive the first touch sensing signal having the first phase from the third driving electrode TE3 through a third driving line TL3, and the second input terminal 422 may receive the second touch sensing signal having the second phase opposite to the first phase from the first driving electrode TE1 through a first driving line TL1. The sensing signal receiving unit 420 may amplify a difference between the first and second touch sensing signals to output the differential sensing signal SER through the output terminal 423. The sensing signal receiving unit 420 may cancel noise included in the first and second touch sensing signals to remove them, and may amplify a difference between the first and second touch sensing signals to improve touch sensitivity.

The switching unit 430 may include first and second switching units 431 and 432 and first and second multiplexers 435 and 436. The first switching unit 431 may connect the first driving signal output module 411 to the first multiplexer 435 during the charging period. The first multiplexer 435 may connect the first driving signal output module 411 to at least one of a plurality of driving lines TL during the charging period. Accordingly, the first driving signal output module 411 may supply the first touch driving signal TDS1 to the at least one driving electrode TE selected by the first multiplexer 435.

The first switching unit 431 may connect the first input terminal 421 of the sensing signal receiving unit 420 to the first multiplexer 435 during the discharging period. The first multiplexer 435 may connect at least one of the plurality of driving lines TL to the first input terminal 421 during the discharging period. Accordingly, the first input terminal 421 may receive the first touch sensing signal from the at least one driving electrode TE selected by the first multiplexer 435.

The second switching unit 432 may connect the second driving signal output module 412 to the second multiplexer 436 during the charging period. The second multiplexer 436 may connect the second driving signal output module 412 to at least one of the plurality of driving lines TL during the charging period. Accordingly, the second driving signal output module 412 may supply the second touch driving signal TDS2 to the at least one driving electrode TE selected by the second multiplexer 436.

The second switching unit 432 may connect the second input terminal 422 of the sensing signal receiving unit 420 to the second multiplexer 436 during the discharging period. The second multiplexer 436 may connect at least one of the plurality of driving lines TL to the second input terminal 422 during the discharging period. Accordingly, the second input terminal 422 may receive the second touch sensing signal from the at least one driving electrode TE selected by the second multiplexer 436.

For example, the driving signal supply unit 410 may sequentially supply a touch driving signal to the plurality of driving electrodes TE. Referring to FIG. 9 together, each of the first and second driving signal output modules 411 and 412 may supply a touch driving signal to at least one driving electrode TE for each of the plurality of electromagnetic sensing periods EMR. The specific point PT may be moved according to the positions of the driving electrodes TE for each of the plurality of electromagnetic sensing periods EMR. The sensing signal receiving unit 420 may sequentially receive the first and second touch sensing signals for each of the plurality of electromagnetic sensing periods EMR. The sensing signal receiving unit 420 may differentially amplify the first and second touch sensing signals to output the differential sensing signal SER for each of the plurality of electromagnetic sensing periods EMR. Accordingly, the touch driver 400 may determine the coordinates of the specific point PT where the touch of the touch input member 20 has occurred among a plurality of specific points PT.

Similarly to the touch driver 400 of FIGS. 13 and 14, the touch driver 400 of FIGS. 15 and 16 may supply a touch driving signal to at least one driving electrode TE and at least one sensing electrode RE, and receive a touch sensing signal from at least one driving electrode TE and at least one sensing electrode RE, for each of the plurality of electromagnetic sensing periods EMR. The control unit 450 may receive the differential sensing signal SER to determine the touch coordinates of the touch input member 20. The control unit 450 may determine the X-axis coordinate of the touch coordinates by analyzing the differential sensing signal SER by some of the plurality of driving electrodes TE, and may determine the Y-axis coordinate of the touch coordinates by analyzing the differential sensing signal SER by some of a plurality of sensing electrodes RE. For example, the control unit 450 may determine the X-axis coordinate of the specific point PT based on the positions of the driving electrodes TE located around the specific point PT, and may determine the Y-axis coordinate of the specific point PT based on the positions of the sensing electrodes RE.

Figure 17:
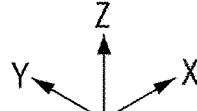
FIG. 17 is a diagram illustrating a touch driving process and charging of a touch input member in a touch sensing system according to still another embodiment.
Figure 18:
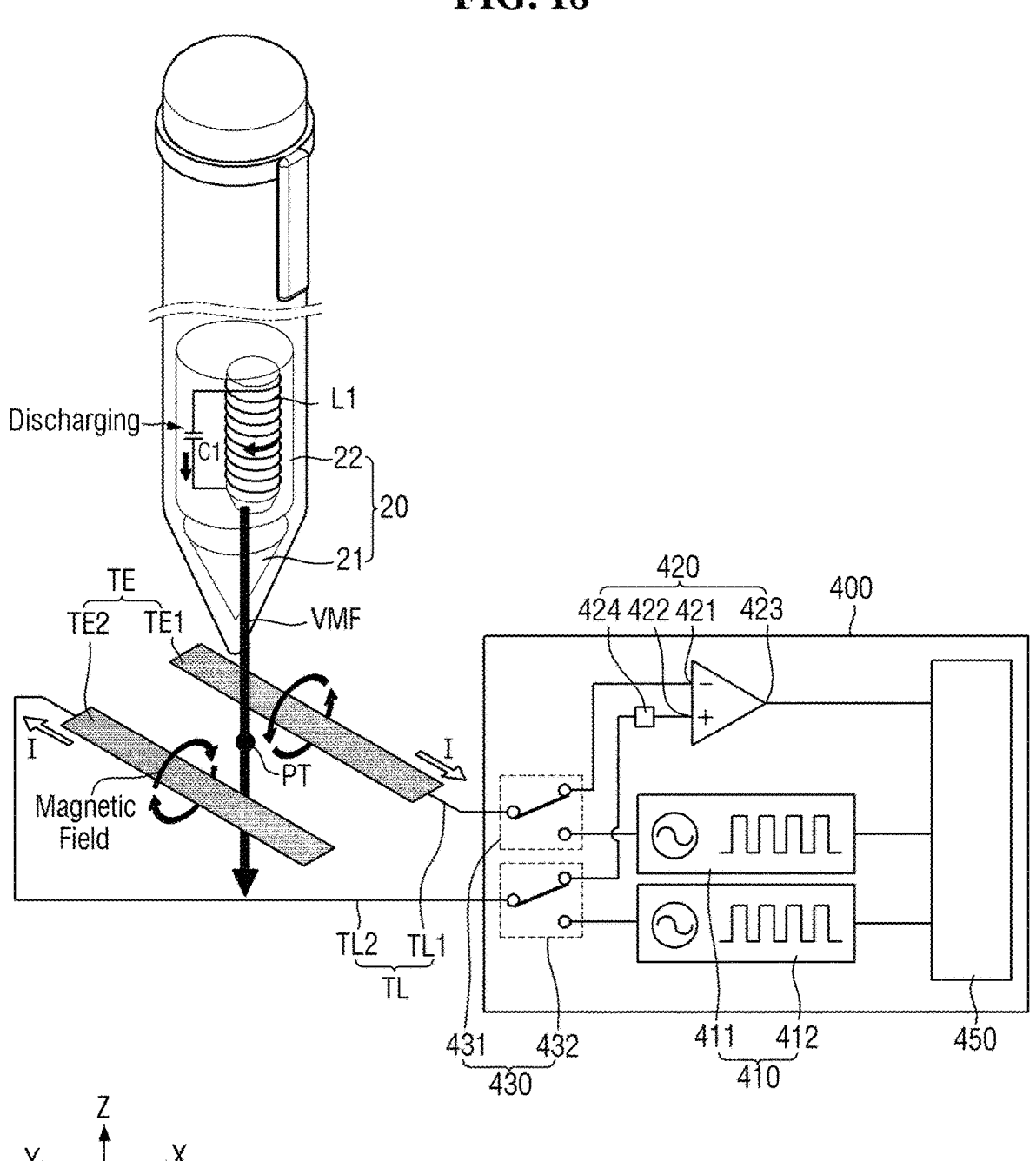
FIG. 18 is a diagram illustrating discharging of a touch input member and a touch sensing process in a touch sensing system according to still another embodiment.
Figure 19:
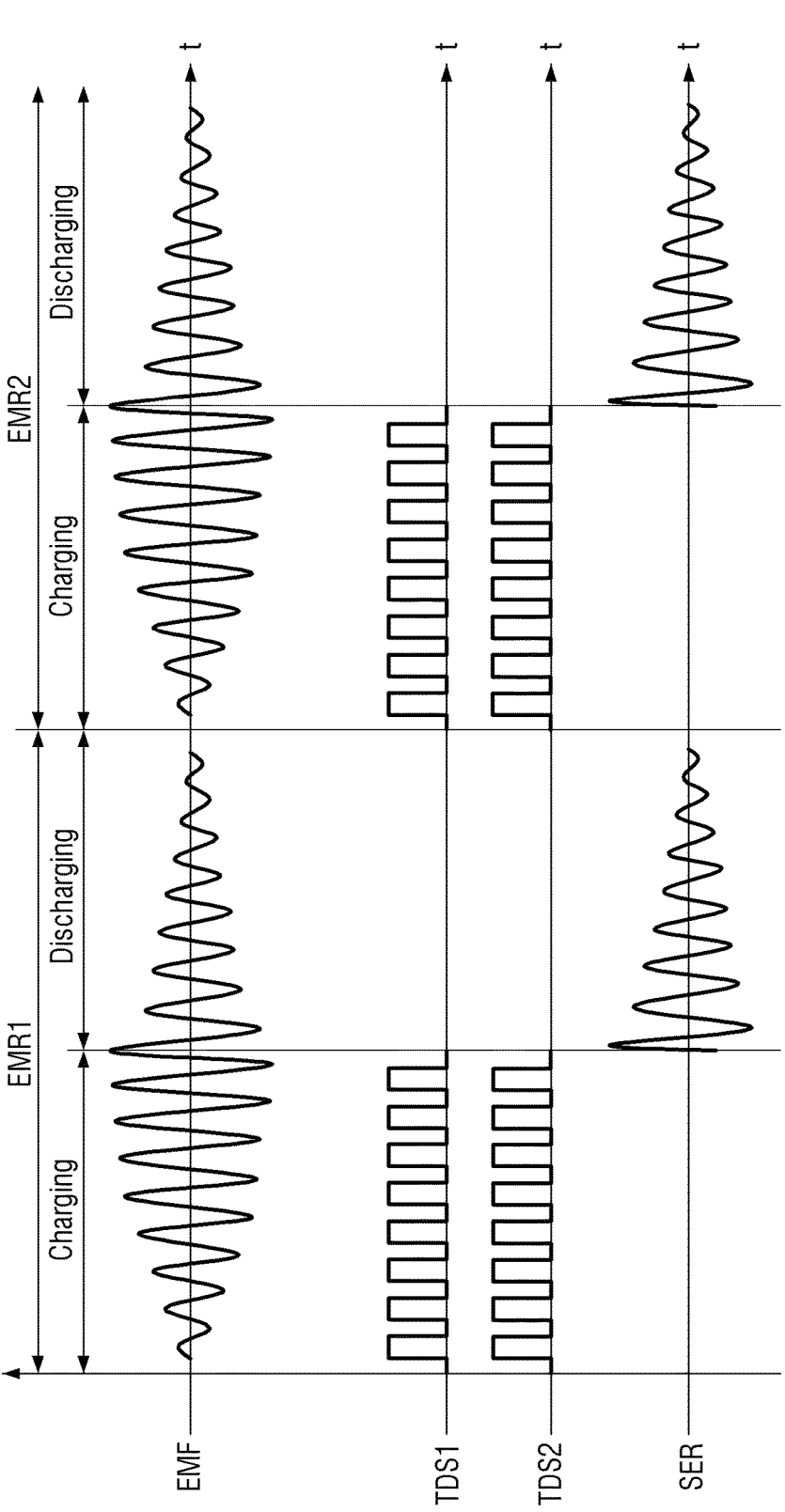
FIG. 19 is a waveform diagram illustrating an electromotive force of a touch input member, a touch driving signal, and a differential sensing signal in a touch sensing system according to still another embodiment.

FIG. 17 is a diagram illustrating a touch driving process and charging of a touch input member in a touch sensing system according to still another embodiment. FIG. 18 is a diagram illustrating discharging of a touch input member and a touch sensing process in a touch sensing system according to still another embodiment. FIG. 19 is a waveform diagram illustrating an electromotive force of a touch input member, a touch driving signal, and a differential sensing signal in a touch sensing system according to still another embodiment. A touch sensing system illustrated in FIGS. 17 to 19 is different from the touch sensing system illustrated in FIGS. 7 to 9 in the configuration of the second driving line TL2 and the second touch driving signal TDS2. A description of the same configuration as the above-described configuration will be briefly given or omitted.

Referring to FIGS. 17 to 19, the touch sensing system may include the display device 10 and the touch input member 20. The display device 10 may include the display panel 100, the display driver 200, the circuit board 300, and the touch driver 400.

The touch driver 400 may include the driving signal supply unit 410, the sensing signal receiving unit 420, the switching unit 430, and the control unit 450.

The driving signal supply unit 410 may supply a touch driving signal to the plurality of driving electrodes TE during the charging period of the electromagnetic sensing period EMR. The driving signal supply unit 410 may include the first driving signal output module 411 and the second driving signal output module 412. The first driving signal output module 411 may supply the first touch driving signal TDS1 having a first phase to the first driving electrode TE1 through the first driving line TL1 during the charging period. The first driving electrode TE1 may be a driving electrode disposed on a first side of a specific point PT or in the first direction (X-axis direction) of the specific point PT among the plurality of driving electrodes TE. The first driving line TL1 may be connected to one end of the first driving electrode TEL or an end opposite to the second direction (Y-axis direction) thereof.

The second driving signal output module 412 may supply a second touch driving signal TDS2 having the first phase to the second driving electrode TE2 through a second driving line TL2 during the charging period. The phases of the first and second touch driving signals TDS1 and TDS2 may be the same. The second driving electrode TE2 may be a driving electrode disposed on a second side of the specific point PT or across the specific point PT in the first direction (X-axis direction) from the first side among the plurality of driving electrodes TE. The second driving line TL2 may be connected to the other end of the second driving electrode TE2 or an end in the second direction (Y-axis direction) thereof. For example, the second driving electrode TE2 may be disposed adjacent to the first driving electrode TE1. In another example, the second driving electrode TE2 may be spaced apart from the first driving electrode TE1 with at least one driving electrode TE interposed therebetween.

For example, when the first driving electrode TE1 receives the first touch driving signal TDS1 having the first phase, a current I may flow in the second direction (Y-axis direction), and a magnetic field may be generated clockwise with respect to the second direction (Y-axis direction). When the second driving electrode TE2 receives the second touch driving signal TDS2 having the first phase, a current I may flow in a direction opposite to the second direction (Y-axis direction) and a magnetic field may be generated counter-clockwise with respect to the second direction (Y-axis direction). Accordingly, the directions of the magnetic fields of the first driving electrode TE1 and the second driving electrode TE2 may coincide at the specific point PT, and thus, according to constructive interference of the magnetic fields, a magnetic field VMF may be generated in the third direction (Z-axis direction).

The touch input member 20 may be charged during the charging period of the electromagnetic sensing period EMR. When the touch input member 20 is adjacent to or in contact with the specific point PT, the touch input member 20 may receive the magnetic field VMF formed in the third direction (Z-axis direction) induced from the current I flowing through the first and second driving electrodes TE1 and TE2 during the charging period. The coil L1 of the touch input member 20 may generate an induced current, and the induced current may charge the capacitor C1. Accordingly, the electromotive force EMF of the capacitor C1 may increase during the charging period.

The touch input member 20 may be discharged during the discharging period of the electromagnetic sensing period EMR. When the touch input member 20 is adjacent to or in contact with the specific point PT, if the supply of the magnetic field VMF formed in the third direction (Z-axis direction) is stopped by the interruption of the supply of the first and second touch driving signals TDS1 and TDS2, the capacitor C1 may be discharged. Accordingly, a current may flow in the coil L1 in a direction opposite to that of the induced current, and the coil L1 may generate the magnetic field VMF passing through the specific point PT in a direction opposite to the third direction (Z-axis direction). The electromotive force EMF of the capacitor C1 may decrease during the discharging period.

For example, when the magnetic field VMF passes through the specific point PT in a direction opposite to the third direction (Z-axis direction), a magnetic field may be generated counterclockwise with respect to the second direction (Y-axis direction) around the first driving electrode TE1, and the current I of the first driving electrode TE1 may flow in a direction opposite to the second direction (Y-axis direction). The current I of the first driving electrode TE1 may be provided to the touch driver 400 through the first driving line TL1 connected to one end of the first driving electrode TE1 or an end opposite to the second direction (Y-axis direction) thereof. Accordingly, the first driving electrode TE1 may provide a first touch sensing signal having a first phase to the touch driver 400. When the magnetic field VMF passes through the specific point PT in a direction opposite to the third direction (Z-axis direction), a magnetic field may be generated clockwise with respect to the second direction (Y-axis direction) around the second driving electrode TE2, and the current I of the second driving electrode TE2 may flow in the second direction (Y-axis direction). The current I of the second driving electrode TE2 may be provided to the touch driver 400 through the second driving line TL2 connected to the other end of the second driving electrode TE2 or an end in the second direction (Y-axis direction) thereof. Accordingly, the second driving electrode TE2 may provide a second touch sensing signal having the first phase to the touch driver 400.

The sensing signal receiving unit 420 may include the first input terminal 421, the second input terminal 422, the output terminal 423, and a phase delay module 424. The phase delay module 424 may delay the phase of the second touch sensing signal received from the second driving electrode TE2. The phase delay module 424 may delay the phase of the second touch sensing signal having the first phase to output the second touch sensing signal having a second phase. A difference between the first phase and the second phase may be 180 degrees. When the touch input member 20 is adjacent to or in contact with the specific point PT, the first input terminal 421 may receive the first touch sensing signal having the first phase from the first driving electrode TE1 through the first driving line TL1, and the second input terminal 422 may receive the second touch sensing signal having the second phase from the phase delay module 424. The sensing signal receiving unit 420 may amplify a differ-ence between the first and second touch sensing signals to output the differential sensing signal SER through the output terminal 423. The sensing signal receiving unit 420 may cancel noise included in the first and second touch sensing signals to remove them, and may amplify a difference between the first and second touch sensing signals to improve touch sensitivity.

The switching unit 430 may selectively connect the driving line TL to one of the driving signal supply unit 410 and the sensing signal receiving unit 420. The switching unit 430 may connect the driving signal supply unit 410 to the driving line TL during the charging period of the touch input member 20. The switching unit 430 may connect the sensing signal receiving unit 420 to the driving line TL during the discharging period of the touch input member 20. For example, the switching unit 430 may periodically connect each of the driving signal supply unit 410 and the sensing signal receiving unit 420 to the driving line TL. For another example, the switching unit 430 may connect each of the driving signal supply unit 410 and the sensing signal receiv-ing unit 420 to the driving line TL based on a control signal of the control unit 450.

The switching unit 430 may include the first switching unit 431 and the second switching unit 432. The first switching unit 431 may connect the first driving signal output module 411 to the first driving line TL1 during the charging period. The first driving signal output module 411 may supply the first touch driving signal TDS1 to the first driving electrode TE1 during the charging period.

The first switching unit 431 may connect the first input terminal 421 of the sensing signal receiving unit 420 to the first driving line TL1 during the discharging period. The first input terminal 421 may receive the first touch sensing signal from the first driving electrode TE1 during the discharging period.

The second switching unit 432 may connect the second driving signal output module 412 to the second driving line TL2 during the charging period. The second driving signal output module 412 may supply the second touch driving signal TDS2 to the second driving electrode TE2 during the charging period.

The second switching unit 432 may connect the phase delay module 424 to the second driving line TL2 during the discharging period. An output of the phase delay module 424 may be provided to the second input terminal 422. Accordingly, the second input terminal 422 may receive the second touch sensing signal from the phase delay module 424 during the discharging period.

Accordingly, the first driving line TL1 may be connected to one end of the first driving electrode TE1 or an end opposite to the second direction (Y-axis direction) thereof, so that the current I of the first driving electrode TE1 may flow in the second direction (Y-axis direction), and the second driving line TL2 may be connected to the other end of the second driving electrode TE2 or an end in the second direction (Y-axis direction) thereof, so that the current I of the second driving electrode TE2 may flow in a direction opposite to the second direction (Y-axis direction). According to constructive interference of the magnetic fields of the first and second driving electrodes TE1 and TE2, a magnetic field VMF may be generated in the third direction (Z-axis direction), thereby charging the touch input member 20. The touch driver 400 may differentially amplify the first and second touch sensing signals induced based on the magnetic field VMF formed in a direction opposite to the third direction (Z-axis direction) according to the discharge of the touch input member 20 to output the differential sensing signal SER, and may determine whether the touch input member 20 has been touched. The display device 10 may sense the touch of the touch input member 20 by using the touch sensing unit TSU that senses the touch of the user's body. Accordingly, the display device 10 may not include a separate sensor layer or a digitizer layer for the electromagnetic resonance of the touch input member 20, thereby reducing the thickness of the display device 10 and reducing cost.

While this disclosure has been described in connection with what is presently considered to be practical embodiments, it is to be understood that the invention is not limited to the disclosed embodiments. The disclosure is intended to cover various modifications and equivalent arrangements included within the spirit and scope of the appended claims.

What is claimed is:

1. An electronic device comprising:
   a display device configured to display an image; and
   a touch input member configured to input a touch to the display device,
   wherein the display device comprises:
   a display unit having a plurality of pixels;
   a touch sensing unit comprising a plurality of touch electrodes disposed on the display unit; and
   a touch driver configured to supply touch driving signals to the plurality of touch electrodes and receive touch sensing signals from the plurality of touch electrodes,
   wherein the touch driver supplies a first touch driving signal having a first phase to at least one of first touch electrodes, and supplies a second touch driving signal having a second phase opposite to the first phase to at least one of second touch electrodes, at least a part of the second touch electrodes being disposed across a specific point from the first touch electrodes,
   wherein the at least one of the first touch electrodes receiving the first touch driving signal having the first phase generates a first magnetic field, and the at least one of the second touch electrodes receiving the second touch driving signal having the second phase generates a second magnetic field, a direction of the second magnetic field being opposite to a direction of the first magnetic field, and
   wherein the touch driver receives a first touch sensing signal having the first phase from the at least one of the first touch electrodes, and receives a second touch sensing signal having the second phase from the at least one of the second touch electrodes.

2. The electronic device of claim 1, wherein the touch input member is charged by an electromagnetic resonance method when the touch input member is disposed at the specific point during a first period in which the first and second touch driving signals are supplied to the touch sensing unit.

3. The electronic device of claim 2, wherein the touch input member is discharged when the supply of the first and second touch driving signals is stopped during a second period immediately after the first period, and
   wherein the touch driver receives the first touch sensing signal having the first phase from the at least one of the first touch electrodes during the second period, and receives the second touch sensing signal having the second phase from the at least one of the second touch electrodes.

4. The electronic device of claim 1, wherein the first touch electrodes comprise a plurality of first driving electrodes extending in a first direction and a plurality of first sensing electrodes extending in a second direction crossing the first direction, and the second touch electrodes comprise a plurality of second driving electrodes extending in the first direction and a plurality of second sensing electrodes extending in the second direction, the first sensing electrodes being across the specific point from the second sensing electrodes, and
   wherein the touch driver supplies the first touch driving signal having the first phase to at least one of the first driving electrodes, and supplies the second touch driving signal having the second phase to at least one of second driving electrodes.

5. The electronic device of claim 4, wherein the touch driver receives the first touch sensing signal having the first phase from one of the first driving electrodes and receives the second touch sensing signal having the second phase from one of the second driving electrodes.

6. An electronic device comprising a display device configured to display an image,
   wherein the display device comprises:
   a display unit having a plurality of pixels;
   a touch sensing unit comprising a plurality of touch electrodes disposed on the display unit; and
   a touch driver configured to supply touch driving signals to the plurality of touch electrodes and receive touch sensing signals from the plurality of touch electrodes,
   wherein the touch driver supplies a first touch driving signal having a first phase to at least one of first touch electrodes, and supplies a second touch driving signal having a second phase to at least one of second touch electrodes, the at least one of the first touch electrodes being disposed on one side of a specific point and the at least one of the second touch electrodes being disposed on the other side of the specific point,
   wherein the touch driver receives a first touch sensing signal having the first phase from the at least one of the first touch electrodes, and receives a second touch sensing signal having the second phase from the at least one of the second touch electrodes, and
   wherein the at least one of the first touch electrodes receives the first touch driving signal having the first phase during a charging period and supplies the first touch sensing signal having the first phase during a discharging period, the at least one of the second touch electrodes receives the second touch driving signal having the second phase during the charging period and supplies the second touch sensing signal having the second phase during the discharging period.

7. The electronic device of claim 6, wherein the at least one of the first touch electrodes comprise a plurality of first driving electrodes extending in a first direction and a plurality of first sensing electrodes extending in a second direction crossing the first direction, and the at least one of the second touch electrodes comprise a plurality of second driving electrodes extending in the first direction and a plurality of second sensing electrodes extending in the second direction, the first sensing electrodes being disposed on one side of the specific point and the second sensing electrodes being disposed on the other side of the specific point, and wherein the touch driver supplies the first touch driving signal having the first phase to one of the first driving electrodes, and supplies the second touch driving signal having the second phase to one of the second driving electrodes.

8. The electronic device of claim 7, wherein the touch driver receives the first touch sensing signal having the first phase from at least one of the first driving electrodes and receives the second touch sensing signal having the second phase from at least one of the second driving electrodes.

9. The electronic device of claim 6, wherein the first touch electrodes comprise a plurality of first driving electrodes extending in a first direction and a plurality of first sensing electrodes extending in a second direction crossing the first direction, and the second touch electrodes comprise a plurality of second driving electrodes extending in the first direction and a plurality of second sensing electrodes extending in the second direction, the first sensing electrodes being across the specific point from the second sensing electrodes, and wherein the touch driver supplies the first touch driving signal having the first phase to the first driving electrodes, and supplies the second touch driving signal having the second phase to the second driving electrodes.

10. The electronic device of claim 9, wherein the touch driver receives the first touch sensing signal having the first phase from the first driving electrodes, and receives the second touch sensing signal having the second phase from the second driving electrodes.

11. The electronic device of claim 6, wherein the touch driver supplies a touch driving signal to N touch electrodes (N being a positive integer) among the plurality of first and second touch electrodes, and receives a touch sensing signal from M touch electrodes (M being a positive integer different from N) among the plurality of first and second touch electrodes.

12. The electronic device of claim 6, wherein the first touch electrodes comprise a plurality of first driving electrodes extending in a first direction, and a plurality of first sensing electrodes extending in a second direction crossing the first direction, and wherein the second touch electrodes comprise a plurality of second driving electrodes extending in the first direction and a plurality of second sensing electrodes extending in the second direction, the first sensing electrodes being across the specific point from the second sensing electrodes, wherein the touch driver supplies the first touch driving signal having the first phase to at least one of the first driving electrodes and one of the first sensing electrodes, and wherein the touch driver supplies the second touch driving signal having the second phase to at least one of the second driving electrodes and one of the second sensing electrodes.

13. The electronic device of claim 12, wherein the touch driver receives the first touch sensing signal having the first phase from the first driving electrodes and the first sensing electrodes, and receives the second touch sensing signal having the second phase from the second driving electrodes and the second sensing electrodes.

14. The electronic device of claim 13, wherein the touch driver determines first axis coordinates of the specific point based on positions of the first and second driving electrodes, and determines second axis coordinates of the specific point based on positions of the first and second sensing electrodes.

15. The electronic device of claim 6, wherein the touch driver comprises:

a driving signal supply unit configured to supply the touch driving signal to the plurality of touch electrodes;

a sensing signal receiving unit configured to receive the touch sensing signal from the plurality of touch electrodes;

a switching unit configured to selectively connect the plurality of touch electrodes to either the driving signal supply unit or the sensing signal receiving unit; and a control unit configured to determine whether a touch has been made based on an output of the sensing signal receiving unit.

16. The electronic device of claim 15, wherein the driving signal supply unit comprises:

a first driving signal output module configured to supply the first touch driving signal to at least one touch electrode disposed on one side of the specific point; and a second driving signal output module configured to supply the second touch driving signal to at least one touch electrode disposed on the other side of the specific point.

17. The electronic device of claim 16, wherein the switching unit comprises:

a first switching unit configured to connect at least one touch electrode disposed on one side of the specific point to the first driving signal output module during a first period, and configured to connect at least one touch electrode disposed on one side of the specific point to a first input terminal of the sensing signal receiving unit during a second period immediately after the first period; and a second switching unit configured to connect at least one touch electrode disposed on the other side of the specific point to the second driving signal output module during the first period, and configured to connect at least one touch electrode disposed on the other side of the specific point to a second input terminal of the sensing signal receiving unit during the second period.

18. The electronic device of claim 17, wherein the switching unit comprises:

a first multiplexer configured to select some of the plurality of touch electrodes and connect the selected touch electrodes to the first switching unit; and a second multiplexer configured to select some other touch electrodes from among the plurality of touch electrodes and connect the selected touch electrodes to the second switching unit.

19. The electronic device of claim 6, wherein a phase difference between the first phase and the second phase is 180 degrees.

20. An electronic device comprising a display device configured to display an image, wherein the display device comprises:

a display unit having a plurality of pixels;

a touch sensing unit comprising a plurality of driving electrodes disposed on the display unit, and a plurality of driving lines connected to the plurality of driving electrodes; and a touch driver configured to supply touch driving signals to the plurality of driving electrodes through the plurality of driving lines and receive touch sensing signals from the plurality of driving electrodes, wherein a first driving line of the plurality of driving lines is connected to one end of a first driving electrode disposed on a first side of a specific point among the plurality of driving electrodes, and a second driving line of the plurality of driving lines is connected to one end of a second driving electrode disposed on a second side of the specific point among the plurality of driving electrodes, and wherein the touch driver includes an amplifier including a first input connected to the first driving line and a second input connected to the second driving line, and a phase delay module connected between the second driving line and the second input.

* * * * *